(12) United States Patent
Lu et al.

(10) Patent No.: US 11,964,689 B2
(45) Date of Patent: Apr. 23, 2024

(54) VEHICULAR TRAILERING GUIDANCE SYSTEM

(71) Applicant: Magna Electronics Inc., Auburn Hills, MI (US)

(72) Inventors: Yuesheng Lu, Farmington Hills, MI (US); Jyothi P. Gali, Rochester Hills, MI (US)

(73) Assignee: Magna Electronics Inc., Auburn Hills, MI (US)

( * ) Notice: Subject to any disclaimer, the term of this patent is extended or adjusted under 35 U.S.C. 154(b) by 249 days.

(21) Appl. No.: 17/647,765

(22) Filed: Jan. 12, 2022

(65) Prior Publication Data

US 2022/0135127 A1    May 5, 2022

Related U.S. Application Data

(63) Continuation-in-part of application No. PCT/US2020/070911, filed on Dec. 16, 2020.
(Continued)

(51) Int. Cl.
*B62D 13/06*    (2006.01)
*B60R 1/26*    (2022.01)
(Continued)

(52) U.S. Cl.
CPC .............. *B62D 13/06* (2013.01); *B60R 1/26* (2022.01); *B60R 11/04* (2013.01); *B62D 1/22* (2013.01);
(Continued)

(58) Field of Classification Search
CPC .. B62D 5/04; B62D 15/0285; B62D 15/0295; B62D 13/06; B62D 1/22; G06V 20/56;
(Continued)

(56) References Cited

U.S. PATENT DOCUMENTS 6,690,268 B2    2/2004  Schofield et al.
7,038,577 B2    5/2006  Pawlicki et al.
(Continued)

OTHER PUBLICATIONS

International Search Report and Written Opinion dated Mar. 8, 2021 from PCT Application No. PCT/US2020/070911, filed Dec. 16, 2020.

*Primary Examiner* — Phutthiwat Wongwian
*Assistant Examiner* — Arnold Castro
(74) *Attorney, Agent, or Firm* — HONIGMAN LLP

(57) ABSTRACT

A vehicular trailer guidance system includes a human machine interface provided in the vehicle and operable by a driver of the vehicle during a backing up maneuver of the vehicle with a trailer hitched thereto. The human machine interface comprises a rotary knob and operates (i) in a backing up trailer left-backup mode when rotated counterclockwise, (ii) in a backing up trailer straight-backup mode when the rotary knob is pushed or pulled and (iii) in a backing up trailer right-backup mode when rotated clockwise. Responsive to selection by the driver of the backup mode, the system sets a desired trailer angle relative to the longitudinal axis of the vehicle to an angle that is commensurate with a driver-selected setting of the rotary knob. The system controls steering of the vehicle to back up the trailer to have the determined trailer angle coincide with the set desired trailer angle.

30 Claims, 22 Drawing Sheets

Related U.S. Application Data

(60) Provisional application No. 63/199,644, filed on Jan. 14, 2021, provisional application No. 62/948,387, filed on Dec. 16, 2019.

(51) Int. Cl.
  B60R 11/04 (2006.01)
  B62D 1/22 (2006.01)
  B62D 5/04 (2006.01)
  B62D 15/02 (2006.01)
  G06V 20/56 (2022.01)

(52) U.S. Cl.
  CPC ......... B62D 5/04 (2013.01); B62D 15/0295 (2013.01); G06V 20/56 (2022.01); B60R 2300/105 (2013.01); B60R 2300/303 (2013.01); B60R 2300/305 (2013.01); B60R 2300/607 (2013.01); B60R 2300/808 (2013.01)

(58) Field of Classification Search
  CPC ......... B60R 2300/14; B60R 2300/105; B60R 2300/303; B60R 2300/305; B60R 2300/607; B60R 2300/808; B60R 2300/8086; B60R 1/00; B60R 1/003; B60R 1/26; B60R 1/27; B60R 11/04; B60W 10/20; B60W 30/18036; B60W 2420/42; B60W 2520/22; B60W 2540/215; G01B 11/272
  See application file for complete search history.

(56) References Cited

U.S. PATENT DOCUMENTS

| | | | |
|---|---|---|---|
| 7,720,580 B2 | 5/2010 | Higgins-Luthman | |
| 7,855,755 B2 | 12/2010 | Weller et al. | |
| 8,972,109 B2 | 3/2015 | Lavoie et al. | |
| 9,085,261 B2 | 7/2015 | Lu et al. | |
| 9,126,525 B2 | 9/2015 | Lynam et al. | |
| 9,264,672 B2 | 2/2016 | Lynam | |
| 9,446,713 B2 | 9/2016 | Lu et al. | |
| 9,558,409 B2 | 1/2017 | Pliefke et al. | |
| 9,762,880 B2 | 9/2017 | Pflug | |
| 9,834,153 B2 | 12/2017 | Gupta et al. | |
| 9,900,522 B2 | 2/2018 | Lu | |
| 10,071,687 B2 | 9/2018 | Ihlenburg et al. | |
| 10,086,870 B2 | 10/2018 | Gieseke et al. | |
| 10,160,382 B2 | 12/2018 | Pliefke et al. | |
| 10,336,255 B2 | 7/2019 | Lynam | |
| 10,532,698 B2 | 1/2020 | Potnis et al. | |
| 10,552,976 B2 | 2/2020 | Diessner et al. | |
| 10,586,119 B2 | 3/2020 | Pliefke et al. | |
| 10,638,025 B2 | 4/2020 | Gali et al. | |
| 10,706,291 B2 | 7/2020 | Diessner et al. | |
| 10,733,757 B2 | 8/2020 | Gupta et al. | |
| 10,755,110 B2 | 8/2020 | Bajpai | |
| 11,702,017 B2 | 7/2023 | Gali et al. | |
| 2008/0181488 A1* | 7/2008 | Ishii | B60R 1/00 382/154 |
| 2014/0085472 A1* | 3/2014 | Lu | B60R 1/002 348/148 |
| 2014/0267689 A1* | 9/2014 | Lavoie | B60W 10/18 348/113 |
| 2015/0022664 A1 | 1/2015 | Pflug et al. | |
| 2015/0115571 A1* | 4/2015 | Zhang | B60D 1/62 280/477 |
| 2015/0217693 A1* | 8/2015 | Pliefke | H04N 7/183 348/118 |
| 2015/0251693 A1* | 9/2015 | Lavoie | B62D 15/0285 701/41 |
| 2015/0251697 A1* | 9/2015 | Lavoie | B62D 13/06 701/523 |
| 2015/0367886 A1 | 12/2015 | Lavoie et al. | |
| 2016/0082887 A1* | 3/2016 | Turk | B60R 1/00 701/300 |
| 2017/0029024 A1* | 2/2017 | Lavoie | B62D 13/06 |
| 2017/0050672 A1* | 2/2017 | Gieseke | B60R 1/00 |
| 2017/0123431 A1* | 5/2017 | Ghneim | G06V 20/56 |
| 2017/0217372 A1 | 8/2017 | Lu et al. | |
| 2017/0254873 A1 | 9/2017 | Koravadi | |
| 2017/0297619 A1* | 10/2017 | Lavoie | B62D 15/024 |
| 2018/0215382 A1 | 8/2018 | Gupta et al. | |
| 2018/0276838 A1* | 9/2018 | Gupta | G06T 7/20 |
| 2018/0299885 A1* | 10/2018 | Herzog | G05D 1/0033 |
| 2018/0312022 A1* | 11/2018 | Mattern | B62D 15/0285 |
| 2019/0061815 A1* | 2/2019 | Sanvicente Herrera | B62D 15/025 |
| 2019/0064831 A1 | 2/2019 | Gali et al. | |
| 2019/0084477 A1* | 3/2019 | Gomez-Mendoza | B62D 13/06 |
| 2019/0118860 A1* | 4/2019 | Gali | B62D 15/029 |
| 2019/0143895 A1 | 5/2019 | Pliefke et al. | |
| 2019/0340787 A1* | 11/2019 | Ramirez Llanos | B60D 1/36 |
| 2020/0017143 A1 | 1/2020 | Gali | |
| 2020/0334475 A1 | 10/2020 | Joseph et al. | |
| 2020/0356788 A1 | 11/2020 | Joseph et al. | |
| 2020/0361397 A1 | 11/2020 | Joseph et al. | |
| 2020/0398753 A1* | 12/2020 | Lu | B62D 15/0275 |
| 2020/0406967 A1 | 12/2020 | Yunus et al. | |
| 2021/0078634 A1 | 3/2021 | Jalalmaab et al. | |
| 2021/0146998 A1* | 5/2021 | Niewiadomski | B60D 1/62 |
| 2021/0166051 A1* | 6/2021 | Jähnisch | H04N 23/71 |
| 2021/0170820 A1 | 6/2021 | Zhang | |
| 2021/0170947 A1 | 6/2021 | Yunus et al. | |
| 2022/0027644 A1 | 1/2022 | Gali et al. | |
| 2022/0028111 A1 | 1/2022 | Gali et al. | |
| 2022/0135127 A1* | 5/2022 | Lu | B62D 5/04 701/41 |
| 2022/0189052 A1* | 6/2022 | Jalalmaab | G06T 7/20 |
| 2023/0001984 A1* | 1/2023 | Lu | B62D 1/22 |
| 2023/0202563 A1* | 6/2023 | Gali | H04N 23/53 701/487 |

\* cited by examiner

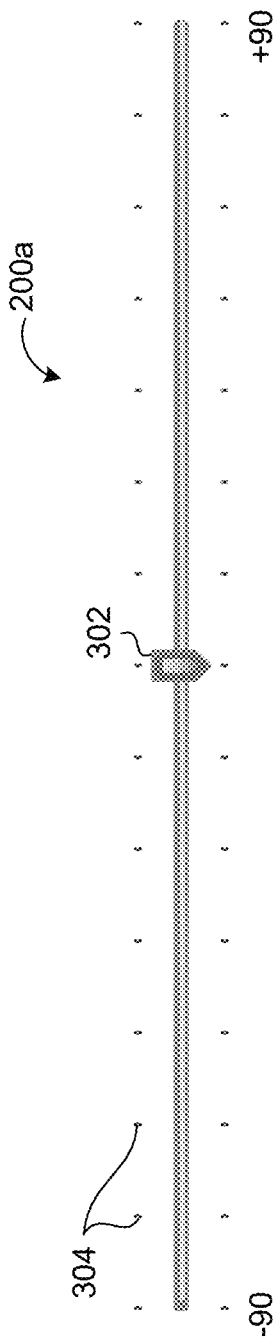
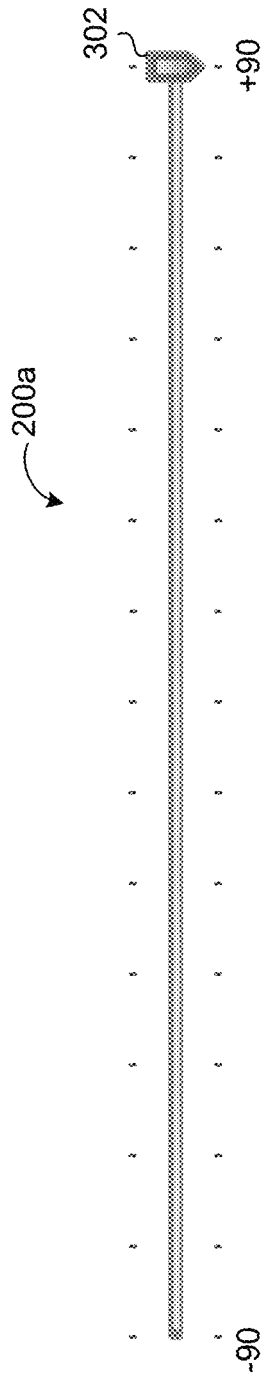
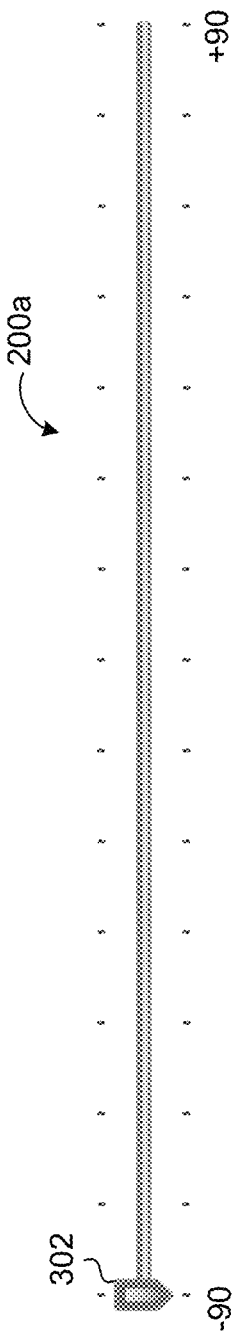
FIG. 4A
FIG. 4B
FIG. 4C

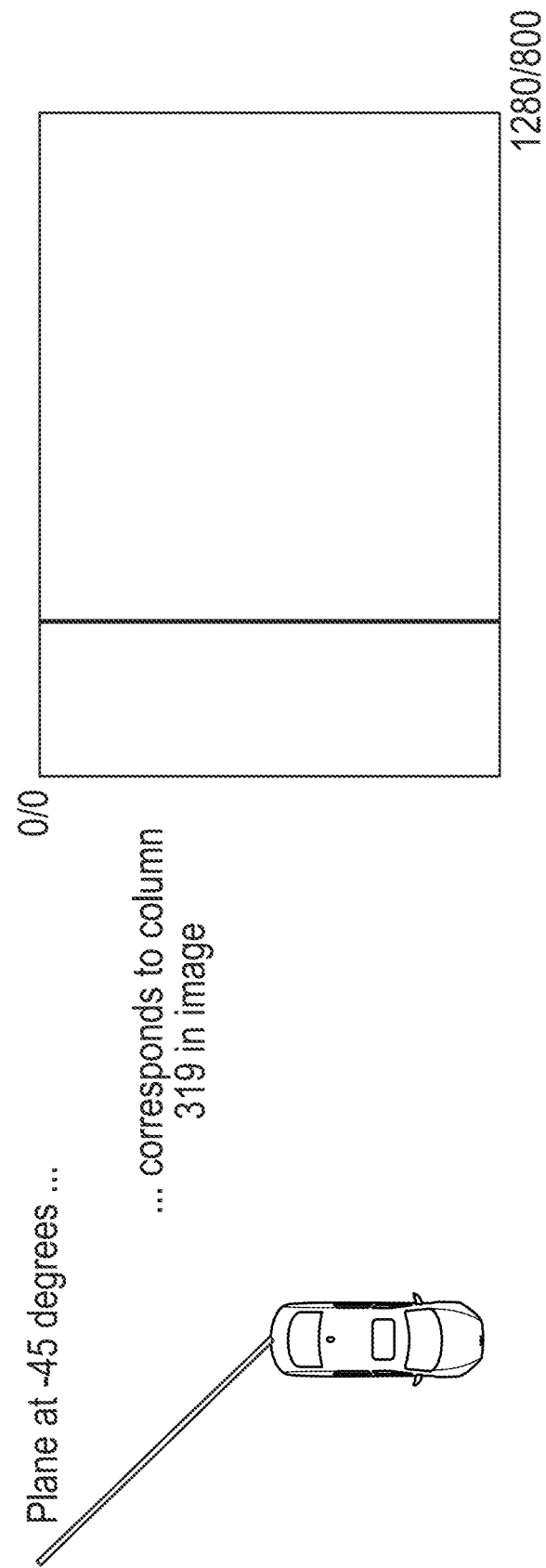

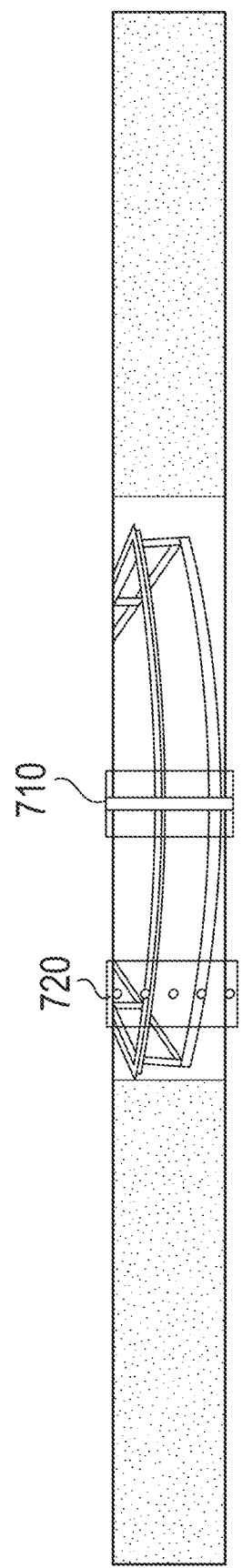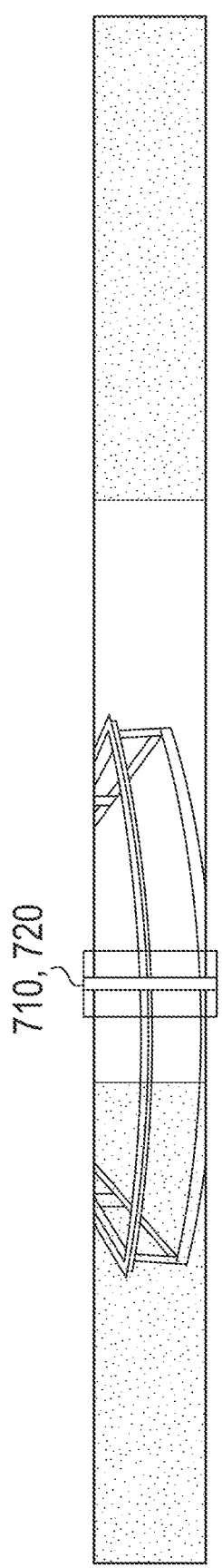

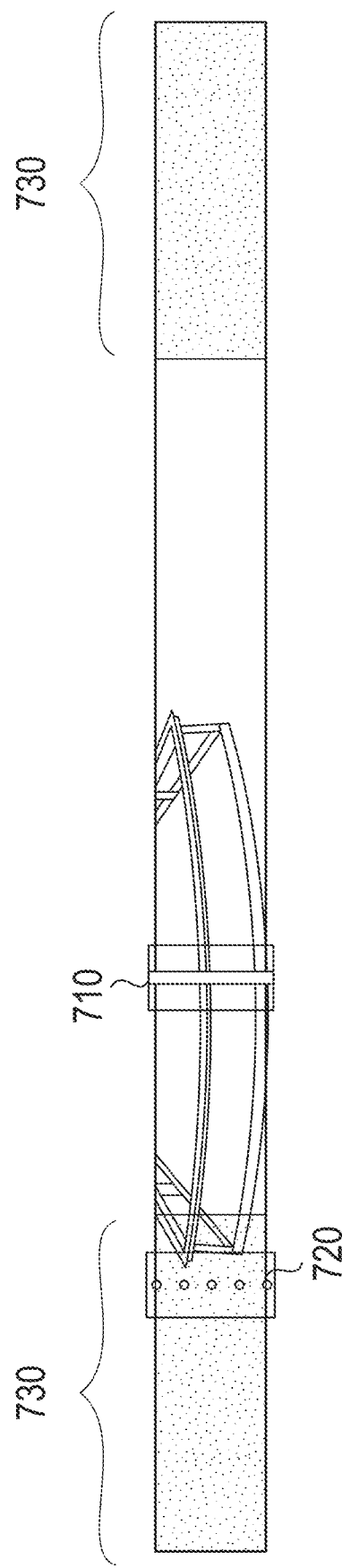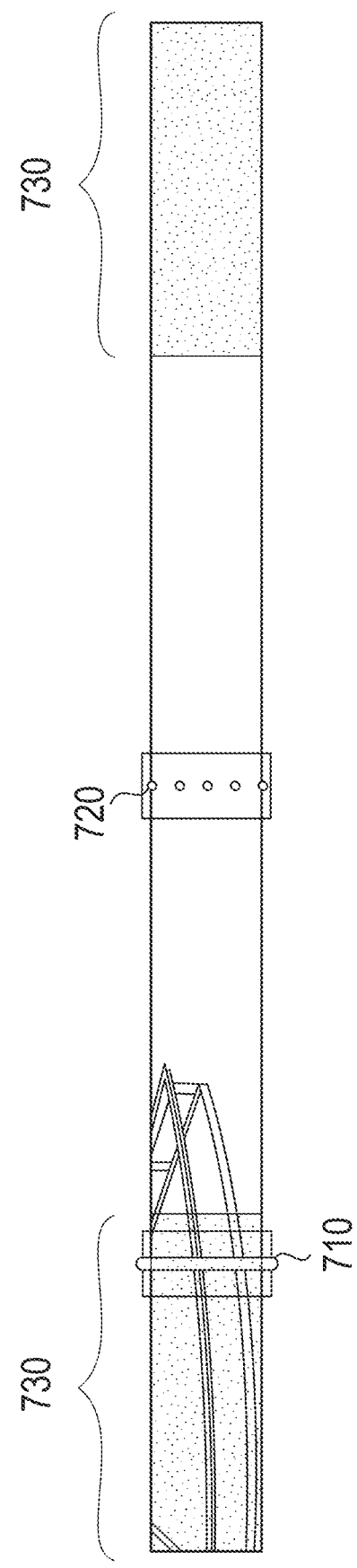

ROTARY KNOB

ROTARY KNOB

ROTARY KNOB

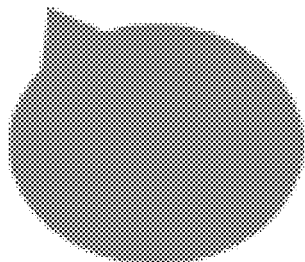

FIG. 17

ROTARY KNOB

Turn knob to a desired rotational position ---- trailer backs-up to the left at (for example) a trailer angle of 15 degrees

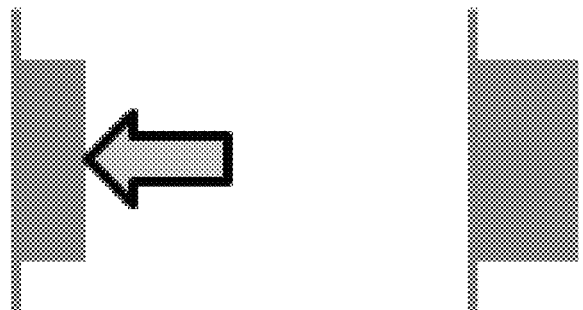

FIG. 18

Momentarily push/press center of knob --- trailer now backs-up straight at a trailer angle of 0 degrees

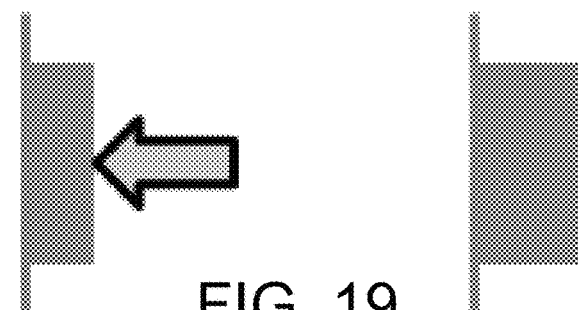

FIG. 19

Momentarily push/press center of knob again (without rotating knob) --- trailer reverts to backing up at the trailer angle of 15 degrees

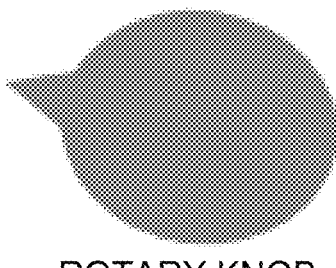

FIG. 20

ROTARY KNOB

Turn knob to another desired rotational position ---- for example, to the left at a trailer angle of 38 degrees ---- system now controls steering of the vehicle to change from zero-degree trailer angle straight-line trailer backing up to the trailer backing up to the left at a trailer angle of 38 degrees

- Calibration maneuver
  - Step 1: Driver needs to Drive the vehicle straight forward with speed greater than 1KPH (no upper limit)
  - Exit criteria:
    - Both the Trailer angle (before entering steady state) and the Front wheel angle at a constant value;
    - The Trailer angle and the front wheel angle shall be less than +/-0.5 degrees and the rate of change of Trailer angle and front wheel shall be less than 0.01rad/sec for 2 seconds.
  - Output of Step1:
    - Detect trailer region from the background;
    - Extract the edges of the trailer;
    - Store the edges as template.
  - TAD would enter steady state

FIG. 24

- Calibration maneuver
  - Step 2: Drive forwards and Turn either left or right
    - Driver to make a turn in drive mode forward with speed greater than 1 KPH (no upper limit) to create
      - Front Wheel angle shall be greater than +/- 10 degrees at least;
      - Trailer angle shall be greater than +/- 10 degrees at least.
    - Exit Criteria:
      - When both Trailer angle and front wheel angle of the vehicle are above 10 degrees for at least 0.5 sec
    - Output of Step2:
      - Start Online Trailer Beam Length Estimation, Hitch Ball Detection and Collision angle modules
      - Start Data Collection: Feature would start collecting the following data as soon the Step2 starts: Trailer angle, Template images at different angles, Refine trailer boundary and eliminate noise (which would used for Collision angle detection) and Vehicle CAN data such as speed, steering angle, front wheel angle, gear

FIG. 25

- Calibration maneuver
  - Step 3: Align the trailer with truck
    - Driver needs to drive straight forward to align the trailer with truck with speed greater than 1KPH (no upper limit)
    - Exit criteria:
      - Both the Trailer angle and the front wheel angle of the vehicle at a constant value;
      - The Trailer angle and the front wheel angle of the vehicle shall be less than +/- 0.5 degrees and the rate of change of front wheel shall be less than 0.01rad/sec for 2 seconds.
    - Output of Step3:
      - Stop Data Collection and process the data;
      - Hitch length;
      - Trailer beam length;
      - Collision angle;
      - Jackknife angle

FIG. 26

VEHICULAR TRAILERING GUIDANCE SYSTEM

CROSS REFERENCE TO RELATED APPLICATIONS

The present application claims the filing benefits of U.S. provisional application Ser. No. 63/199,644, filed Jan. 14, 2021, which is hereby incorporated herein by reference in its entirety. The present application also is a continuation-in-part of PCT Patent Application No. PCT/US20/70911 filed Dec. 16, 2020, which claims priority of U.S. provisional application Ser. No. 62/948,387, filed Dec. 16, 2019, which are both hereby incorporated herein by reference in their entireties.

FIELD OF THE INVENTION

The present invention relates generally to a vehicle and trailer guidance system for guiding a vehicle and trailer during a reversing maneuver.

BACKGROUND OF THE INVENTION

Use of imaging sensors to help a driver when backing up a trailer is common and known. Examples of such known systems are described in U.S. Pat. Nos. 9,446,713 and 9,085,261, which are hereby incorporated herein by reference in their entireties.

SUMMARY OF THE INVENTION

The present invention provides a driver guidance system for a vehicle with a trailer hitched thereto. The system utilizes a camera disposed at a rear portion of a vehicle and having a field of view exterior of the vehicle, the field of view encompassing at least a portion of the trailer hitched to the vehicle. The system also includes a control comprising electronic circuitry and associated software, with the electronic circuitry including a processor operable to process image data captured by the camera. The image data captured by the camera is representative of the trailer hitched to the vehicle. The control, responsive to processing of image data captured by the camera, is operable to detect a current trailer angle relative to the vehicle. The system also includes a user input as part of a human machine interface (HMI), and the driver, via actuation/use of the user input, selects and sets a desired trailer angle. The control, responsive to the determined current trailer angle and the set desired trailer angle, sets a steering angle that, during movement by the vehicle, steers the vehicle so that the current trailer angle approaches the set desired trailer angle.

The HMI may comprise a knob or dial (or slider) that the driver can rotate (or move/slide) one way or the other to set a direction or angle of the trailer relative to the centerline of the vehicle for backing up the vehicle and trailer. When the driver sets/rotates the knob or slider and then releases the knob or slider, the system controls steering of the vehicle during backing up of the vehicle and trailer to bring the current trailer angle (i.e., the angle the centerline of the trailer is making relative to the centerline of the vehicle to which the trailer is hitched) to coincide with the rotation of the knob (or sliding of the slider). In other words, the HMI does not automatically spring back or is biased to a zero position when it is released. In order to return the system to a zero degree setting (where the system controls steering of the vehicle to bring the current trailer angle to be at zero degrees relative to the centerline of the vehicle), the driver can push or pull the dial or knob (or move the slider back to zero). When the knob is pushed (or pulled), such as in a direction along (i.e., parallel to) the axis of rotation of the knob, the knob does not rotate back to a zero position (i.e., the knob remains at its position when pushed or pulled). Responsive to the knob being pushed (or pulled), the system automatically controls the steering of the vehicle to bring the trailer angle to the zero degree angle. When the knob is released by the driver (after pushing or pulling), the knob reverts to the non-pushed/non-pulled position and either (i) the system remains at the zero degree angle setting for trailer backup (i.e., the trailer is backed straight up) or (ii) the system reverts to the trailer angle setting that the knob was set at before the knob was pushed or pulled.

Thus, in accordance with the present invention, a vehicular trailer guidance system comprises:

a rear backup camera disposed at a rear portion of a vehicle, the vehicle equipped with (i) an electronically controlled power steering system and (ii) a trailer ball hitch configured for connection to a trailer tongue of a trailer;

wherein the rear backup camera views at least rearward of the vehicle;

wherein, with a trailer tongue of a trailer hitched at the trailer ball hitch of the vehicle to form a pivoting joint attaching the trailer to the vehicle, the rear backup camera views at least a portion of the trailer tongue hitched to the vehicle;

wherein the rear backup camera captures image data;

a human machine interface provided in an interior cabin of the vehicle and operable by a driver in a driver seat of the vehicle during a backing up maneuver of the vehicle and trailer, wherein the human machine interface is operable in (i) a backing up trailer left-backup mode, (i) a backing up trailer straight-backup mode and (iii) a backing up trailer right-backup mode;

wherein the human machine interface comprises a rotary knob, and wherein (i) the human machine interface operates in the backing up trailer left-backup mode when rotated counter-clockwise, (ii) the human machine interface operates in the backing up trailer straight-backup mode when one selected from the group consisting of (a) the rotary knob is pushed and (b) the rotary knob is pulled and (iii) the human machine interface operates in the backing up trailer right-backup mode when rotated clockwise;

an electronic control unit (ECU) comprising electronic circuitry and associated software, the electronic circuitry comprising an image processor operable to process image data captured by the rear backup camera;

wherein the ECU, responsive at least in part to processing by the image processor of image data captured by the rear backup camera, determines trailer angle of the trailer tongue relative to a longitudinal axis of the vehicle;

wherein, responsive to selection by the driver of the backing up trailer left-backup mode, the ECU sets a desired trailer angle of the trailer tongue leftward relative to the longitudinal axis of the vehicle to an angle that is commensurate with a driver-selected setting of a left-backup input device of the backing up trailer left-backup mode selected by the driver;

wherein, responsive to selection by the driver of the backing up trailer right-backup mode, the ECU sets the desired trailer angle of the trailer tongue rightward relative to the longitudinal axis of the vehicle to an angle that is commensurate with a driver-selected setting of a right-backup input device of the backing up trailer right-backup mode selected by the driver;

wherein, responsive to selection by the driver of the backing up trailer straight-backup mode by one selected from the group consisting of (a) pushing the rotary knob and (b) pulling the rotary knob, the ECU sets the desired trailer angle of the trailer tongue to a zero degree angle relative to the longitudinal axis of the vehicle; and wherein the ECU, based at least in part on the determined trailer angle and the set desired trailer angle, and while the vehicle is backing up the trailer, controls the electronically controlled power steering system of the vehicle to steer the vehicle to back up the trailer to have the determined trailer angle coincide with the set desired trailer angle.

The left-backup input device and the right-backup input device of the vehicular trailer guidance system may comprise a laterally adjustable slider element that is slidable to the left of center for the backing up trailer left-backup mode, and to the right of center for the backing up trailer right-backup mode, and wherein positioning by the driver of the slider element at a center position selects the backing up trailer straight-backup mode. The laterally adjustable slider element may comprise a plurality of demarcations at each side of the center position, wherein each demarcation corresponds to a respective trailer angle of the trailer tongue relative to the longitudinal axis of the vehicle. The laterally adjustable slider element may comprise an indicator, wherein the indicator indicates the set desired trailer angle of the trailer tongue relative to the longitudinal axis of the vehicle.

The left-backup input device of the vehicular trailer guidance system may comprise a left-side laterally adjustable slider element, and the right-backup input device may comprise a right-side laterally adjustable slider element, wherein the backing up trailer straight-backup mode may be selected via the driver pressing a straight-backup button. The straight-backup button may be disposed between the left-side laterally adjustable slider element and the right-side laterally adjustable slider element.

The left-backup input device of the vehicular trailer guidance system may comprise a backup-left button, and the backing up trailer straight-backup mode is selected via actuation by the driver of a backup-straight button, and the right-backup input device may comprise a backup-right button, wherein the backup-straight button is located between the backup-left button and the backup-right button. The ECU may set a desired trailer angle of the trailer tongue leftward relative to the longitudinal axis of the vehicle that is commensurate with an amount of time that the driver presses the backup-left button, and the ECU may set a desired trailer angle of the trailer tongue rightward relative to the longitudinal axis of the vehicle that is commensurate with an amount of time that the driver presses the backup-right button.

The human machine interface may comprise a rotary knob, wherein (i) the human machine interface operates in the backing up trailer left-backup mode when rotated counter-clockwise, (ii) the human machine interface operates in the backing up trailer straight-backup mode when the rotary knob is pushed or pulled and (iii) the human machine interface operates in the backing up trailer right-backup mode when rotated clockwise. Responsive to selection by the driver of the backing up trailer left-backup mode by rotating the rotary knob in the counter-clockwise direction, the ECU sets a desired trailer angle of the trailer tongue leftward relative to the longitudinal axis of the vehicle to an angle that is commensurate with a driver-selected setting of the rotary knob. Responsive to selection by the driver of the backing up trailer right-backup mode by rotating the rotary knob in the clockwise direction, the ECU sets the desired trailer angle of the trailer tongue rightward relative to the longitudinal axis of the vehicle to an angle that is commensurate with a driver-selected setting of the rotary knob. Responsive to selection by the driver of the backing up trailer straight-backup mode by pushing or pulling the rotary knob, the ECU sets the desired trailer angle of the trailer tongue to a zero degree angle relative to the longitudinal axis of the vehicle.

These and other objects, advantages, purposes and features of the present invention will become apparent upon review of the following specification in conjunction with the drawings.

BRIEF DESCRIPTION OF THE DRAWINGS

FIGS. 4A-4C are plan views of exemplary user inputs of a human machine interface for use with the trailer guidance system;

FIGS. 9A and 9B are schematic views a forty-five degree angle converted to a cylindrical view;

FIG. 10A is a perspective view of the trailer of FIG. 7 with a desired trailer angle of negative twenty-five degrees relative to the vehicle and a current trailer angle of zero degrees relative to the vehicle;

FIG. 10B is a perspective view of the trailer of FIG. 7 with a desired trailer angle of negative twenty-five degrees relative to the vehicle and a current trailer angle of negative twenty-five degrees relative to the vehicle;

FIG. 11A is a perspective view of the trailer of FIG. 7 with a desired trailer angle within a jackknife zone of the trailer;

FIG. 11B is a perspective view of the trailer of FIG. 7 with a current trailer angle within the jackknife zone of the trailer;

FIGS. 17-20 are views of a rotary knob showing an exemplary inputs for backing up the vehicle and trailer;

FIGS. 24-26 set forth the steps of a calibration maneuver for calibrating a trailer hitched to the vehicle;

DESCRIPTION OF THE PREFERRED EMBODIMENTS

Figure 1:
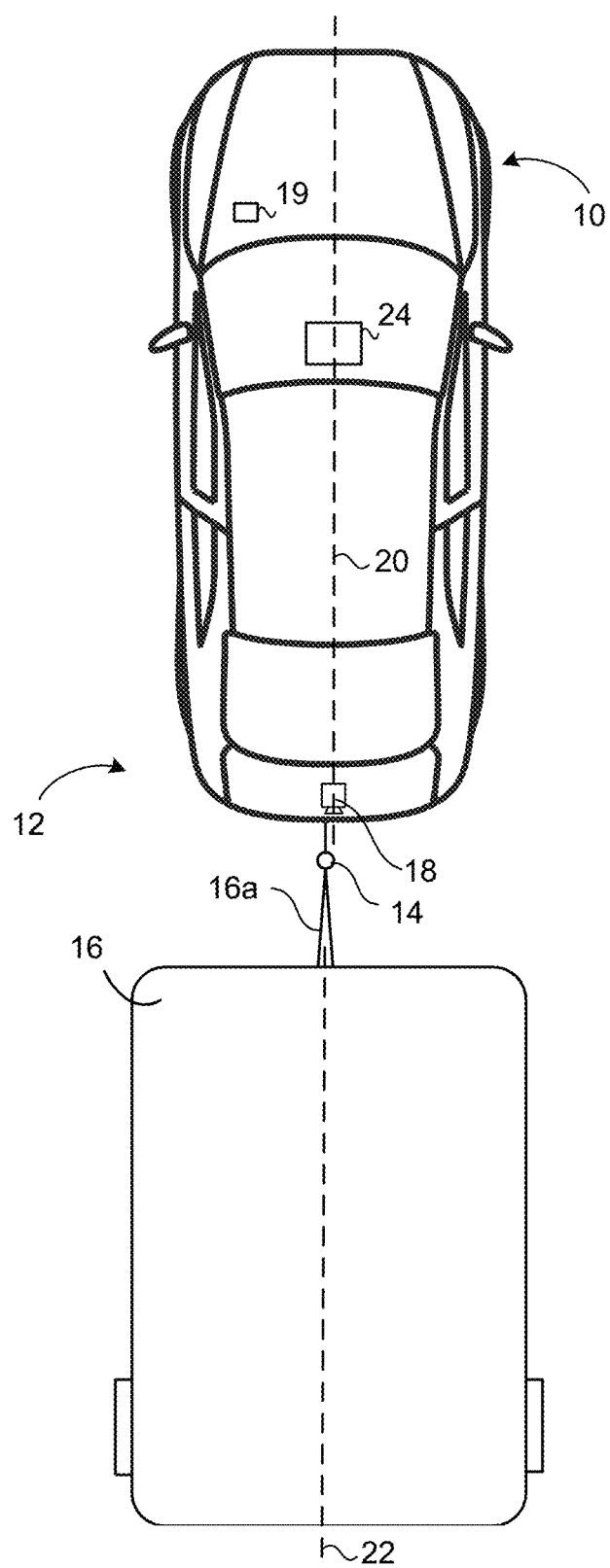
FIG. 1 is a plan view of a vehicle with a trailer guidance system that is operable to steer a trailer along a trailer direction in accordance with the present invention.

Referring now to the drawings and the illustrative embodiments depicted therein, a vehicle 10 includes a trailer maneuvering or guidance system 12 that is operable to guide during backing up or reversing of the vehicle with a hitched trailer 16. The trailer 16 is hitched at the vehicle via, for example, a hitch 14 (such as via a trailer coupler at the end of a trailer tongue 16a hitching to the hitch ball of the hitch of the vehicle to establish a pivoting joint connection of the trailer 16 to the vehicle 10). The trailer guidance system 12 may guide and maneuver the vehicle 10 and trailer 16 toward a desired or selected location. The trailer guidance system may utilize aspects of the trailer guidance systems described in International PCT Application No. PCT/US2020/070911, filed Dec. 16, 2020 and published Jun. 24, 2021 as International Publication No. WO 2021/127693, and described in U.S. provisional application Ser. No. 62/948,387, filed Dec. 16, 2019, which are hereby incorporated herein by reference in their entireties.

In the illustrated embodiment, the trailer guidance system 12 includes at least one exterior viewing vehicle-based imaging sensor or camera, such as a rearward viewing imaging sensor or camera or rear backup camera 18 (and the system may optionally include multiple exterior viewing imaging sensors or cameras, such as a sideward/rearward viewing camera at respective sides of the vehicle and/or trailer), which captures image data representative of the scene exterior and rearward of the vehicle 10, which includes the hitch 14 and/or trailer 16, with the rear backup camera 18 having a lens for focusing images at or onto an imaging array or imaging plane or imager of the camera (FIG. 1). The hitch 14 comprise a trailer ball hitch at which the trailer tongue 16a of the trailer 16 hitches to form a pivoting joint attaching the trailer 16 to the vehicle 10. The trailer maneuver guidance system 12 includes a control or electronic control unit (ECU) 19 comprises electronic circuitry, including memory chips, at least one data processor, and associated software. The electronic circuitry includes a processor that is operable to process image data captured by the camera or cameras and may detect objects or the like and/or provide displayed images at a display device for viewing by the driver of the vehicle (the control and/or display device may be part of or incorporated in or at an interior rearview mirror assembly of the vehicle, or the control and/or the display device may be disposed elsewhere at or in the vehicle). The data transfer or signal communication from the camera to the ECU may comprise any suitable data or communication link, such as a vehicle network bus or the like of the equipped vehicle.

The trailer guidance system 12 receives an input from a user (e.g., the driver of the vehicle) that indicates a desired direction or trailer angle for the trailer 16 hitched to the vehicle 10. Based on the received driver input, the system controls steering of the towing vehicle (e.g., moves the steering wheel) to direct the vehicle and the trailer hitched to the vehicle toward an orientation where the current trailer angle relative to the vehicle (as determined via processing of image data captured by the rearward viewing camera or rear backup camera or determined via other trailer angle detection systems) is at the desired or selected trailer angle. For example, the trailer guidance system calculates a current angle between the centerline longitudinal axis 20 of the vehicle and centerline longitudinal axis 22 of the trailer 16 (at least of the trailer tongue 16a of the trailer 16) using the image data from the rearward viewing camera 18 and/or a truck bed camera and/or one or more side cameras. The trailer guidance system calculates a direction of the steering wheel and amount of steering wheel rotations required to convert the current trailer angle to the desired trailer angle. The system supports all types of conventional trailers including vehicle haulers, box trailers, utility trailers, loaded and unloaded boat trailers, snow mobiles, and any other custom trailers, fifth wheels, or goose neck types of trailers. The system performs independent of ambient conditions (e.g., day, night, sun, cloud, rain, snow) and environmental surfaces (e.g., concrete, asphalt, gravel, grass, dirt, etc.). In some examples, the system displays information pertaining to the current trailer angle of the trailer relative to the vehicle and the desired trailer angle of the trailer relative to the vehicle, and the jackknife and collision angles of the trailer 16 hitched to the towing vehicle 10.

Figure 2:
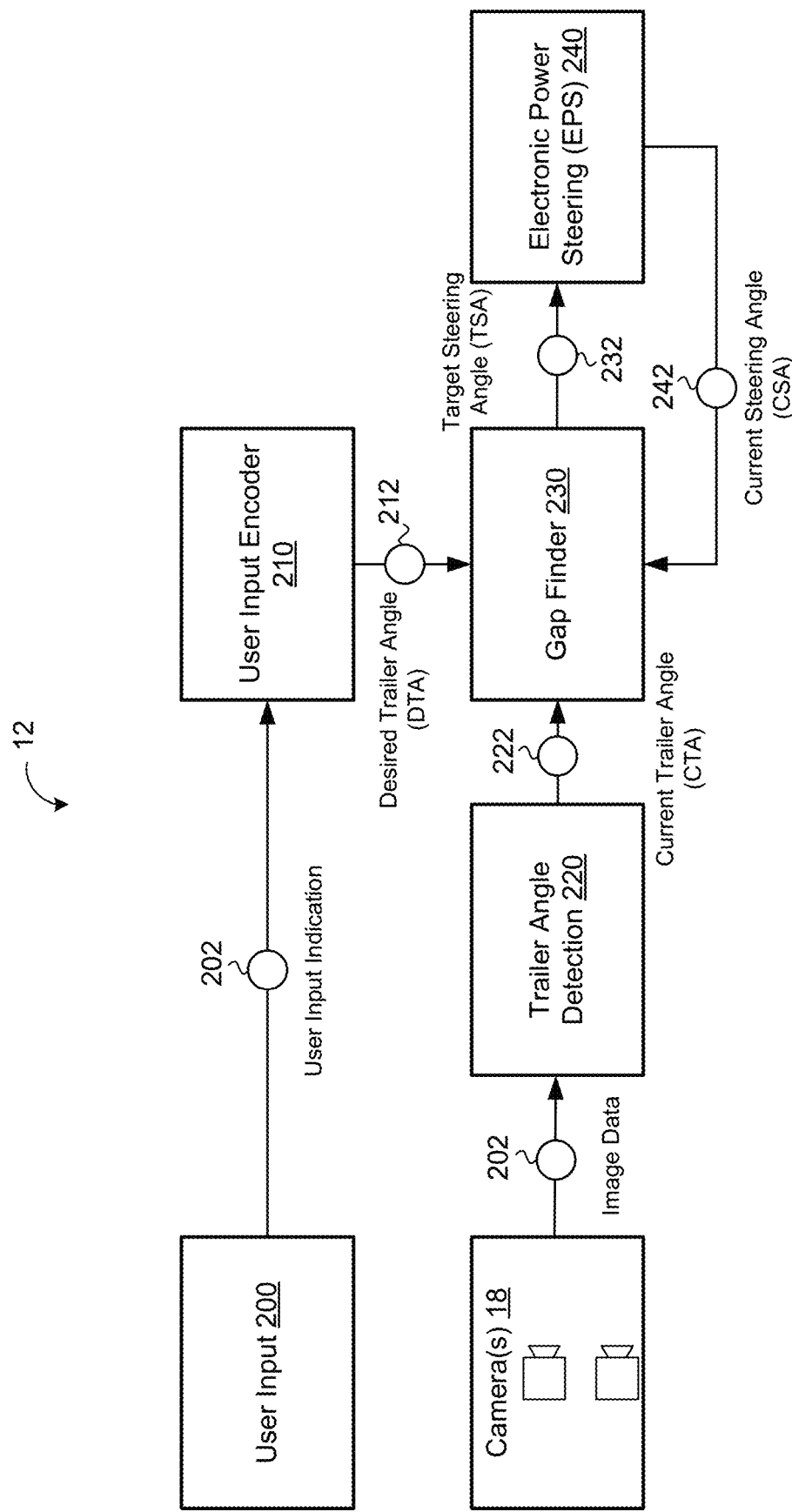
FIG. 2 is a schematic view of exemplary components of the trailer guidance system of FIG. 1.

Referring now to FIG. 2, the user or driver input 200 (as part of a human machine interface or HMI of the vehicle), which is actuated or used by a user or driver in the vehicle, may transmit a user input indication 201 to a user input encoder 210. The encoder 210 converts the user input indication 201 into a desired trailer angle (DTA) 212 that represents the trailer angle desired by the user. The image data 202 captured by one or more cameras 18 is transmitted to a trailer angle detection module 220. The trailer angle detection module 220 processes the provided image data 202 to determine a current trailer angle (CTA) 222, which represents the angle between the centerline axis of the vehicle 20 and the centerline axis of the trailer 22.

A gap finder module 230 receives the DTA 212 from the encoder 210 and the CTA 222 from the trailer angle detection module. The gap finder module may also receive a current steering angle (CSA) 242 from an electronic power steering (EPS) module 240 of the vehicle. Using the DTA 212, the CTA 222, and the CSA 242, the gap finder module 230 determines a target steering angle (TSA) 232 that represents an angle the steering wheel may be set to that will direct the vehicle and trailer in a manner to achieve the DTA 212. The gap finder module 230 may transmit the TSA to the EPS 240 to automatically control steering of the steering wheel to the TSA 232.

Figure 3:
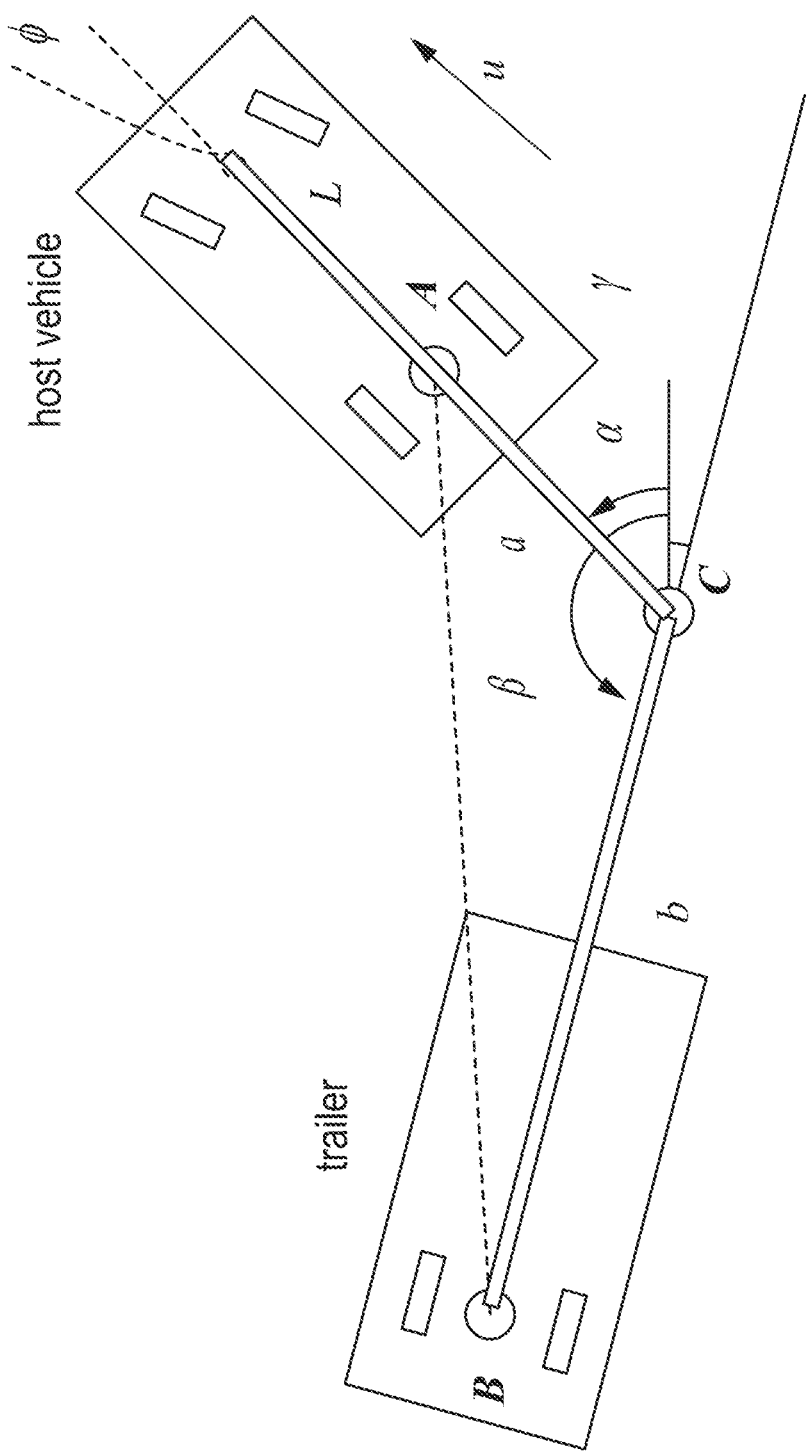
FIG. 3 is a schematic view of a host vehicle and trailer annotated with kinematic variables.

Referring now to FIG. 3, in some examples, the gap finder module 230 determines a target steering angle 232 using Equation (1), where $\varphi$ represents the front wheel angle, a represents a distance between the rear axle of the vehicle and the hitch, b represents a beam length of the trailer (which may be entered via a user input or which may be estimated or determined via a beam length estimation process or system, such as by utilizing aspects of the systems described in U.S. patent application Ser. No. 17/643,596, filed Dec. 10, 2021, and/or Ser. No. 17/443,258, filed Jul. 23, 2021, which are hereby incorporated herein by reference in their entireties), γ represents the CTA 222, $\gamma_{des}$ represents the DTA 212, L represents the vehicle wheelbase, and u represents a velocity of the vehicle.

$$\varphi = \operatorname{atan}\left(\frac{L}{u + u\frac{a}{b}\cos(\gamma - \gamma_{des})}\left[\frac{u}{b}\sin(\gamma - \gamma_{des}) - K(\gamma - \gamma_{des})\right]\right) \quad (1)$$

The gap finder module 230 may convert the front wheel angle (φ) determined from Equation (1) into the TSA 232 for the EPS 240.

Optionally, and such as shown in FIGS. 4A-4C, the user input 200 may comprise a slider input or slider 200a. The slider 200a includes an indicator 302 that indicates a current value of the slider 200a. The current value of the slider may represent the trailer angle desired by the user. The slider 200a also includes a plurality of bins or demarcations 304 that indicate different values the indicator 302 may be set to. That is, the indicator 302 may be positioned at any of the demarcations 304 to generate the user input indication 201 with the value of the demarcation 304 that the indicator 302 is set to.

The slider 200a may include a minimum value and a maximum value. For example, the slider 200a may have a minimum value at the left-most demarcation 304 and a maximum value at a right-most demarcation 304. The minimum value and the maximum value may correspond with a minimum trailer angle and a maximum trailer angle relative to the vehicle that may be selected. In some examples, the minimum trailer angle may be −90 degrees while the maximum trailer angle may be +90 degrees. The slider 200a may have a center demarcation 304 that indicates or corresponds to a trailer angle of 0 degrees relative to the vehicle. FIG. 4A illustrates the indicator 302 at the center demarcation 304 for a desired trailer angle of 0 degrees, while FIG. 4B illustrates the indicator 302 at the maximum trailer angle (i.e., the right-most demarcation 304) of +90 degrees and FIG. 4C illustrates the indicator 302 at the minimum trailer angle of −90 degrees (i.e., the left-most demarcation 304).

Thus, in some examples, the user may adjust the position of the indicator 302 of the slider 200a to one of the demarcations 304 that corresponds with the trailer angle desired by the user. When the user desires a trailer angle of 0 (i.e., the vehicle's centerline axis 20 is aligned with the trailer's centerline axis 22), the user may position the indicator 302 at the center demarcation 304. When the user desires a maximum trailer angle (e.g., +90 degrees), which corresponds with the trailer positioned towards the passenger side of the vehicle (which in a left-hand drive vehicle, such as used in the United States, is at the right-hand side of the vehicle), the user may position the indicator 302 at the right-most demarcation 304. Similarly, when the user desires a minimum trailer angle (e.g., −90 degrees), which corresponds with the trailer positioned towards the driver side of the vehicle, the user may position the indicator 302 at the left-most demarcation 304. That is, the direction of the indicator with relation to the slider 200a may be aligned with the direction of the trailer in the vehicle's coordinate system (i.e., when the indicator 302 is positioned to the right of the center point, the user desires the trailer to move to the right of the vehicle, and when the indicator 302 is positioned to the left of the center point, the user desires the trailer to move to the left of the vehicle). The user may position the indicator 302 at any demarcation 304 in-between the left-most demarcation 304 and the right-most demarcation 304 to set a desired trailer angle between the minimum trailer angle and the maximum trailer angle. In some examples, indicator positions to the right of the center demarcation represent positive trailer angles while indicator positions to the left of the center demarcation represent negative trailer angles.

The slider 200a may include any number of demarcations 304. In some examples, a number of demarcations (N) is based on a resolution (R) of the slider 200a, such that R=1/N. Each demarcation 304 may represent a regular interval of a desired trailer angle. For example, each demarcation 304 may represent an increase or decrease of 10 degrees from the previous demarcation 304. That is, if the left-most demarcation 304 represents a desired trailer angle of −90 degrees, when the interval is 10 degrees, the demarcation to the right of the left-most demarcation may represent a desired trailer angle of −80 degrees. The indicator need not (and desirably does not) display the trailer angles represented by the demarcations, as the driver, when selecting a demarcation, may only initially approximate a desired angle between zero degrees and 90 degrees or between zero and negative 90 degrees, without knowing the actual angle being selected. Although for illustrative purposes a scale in terms of angles is discussed above, a driver utilizing the present system need not know (and often does not care to know) particular angles of the trailer relative to the vehicle at any given moment of time. Thus, whatever scale provided to the driver is merely indicative of degree of turn to the right or degree of turn to the left and could, for instance, be a numerical scale of 0+/−10 or could be a colored scale with the intensity of color increasing or decreasing as the driver respectively slides from the center to, for example, the right, with, for example, the rightmost sided position being the darkest color and the positions closer to the central point be lighter color or semi-transparent.

Figure 5:
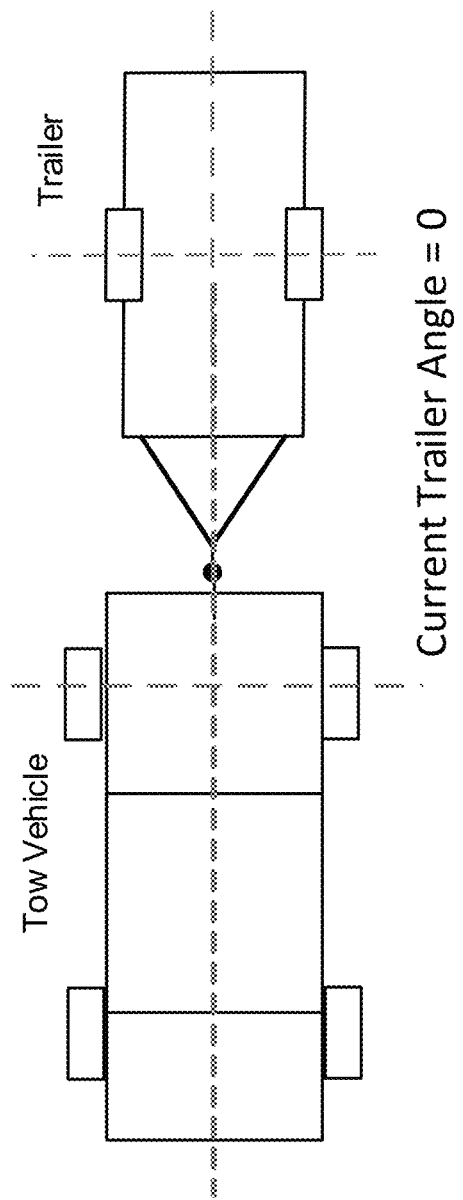
FIG. 5 is a schematic view of a vehicle and a trailer with a zero degree trailer angle relative to the vehicle.
Figure 6:
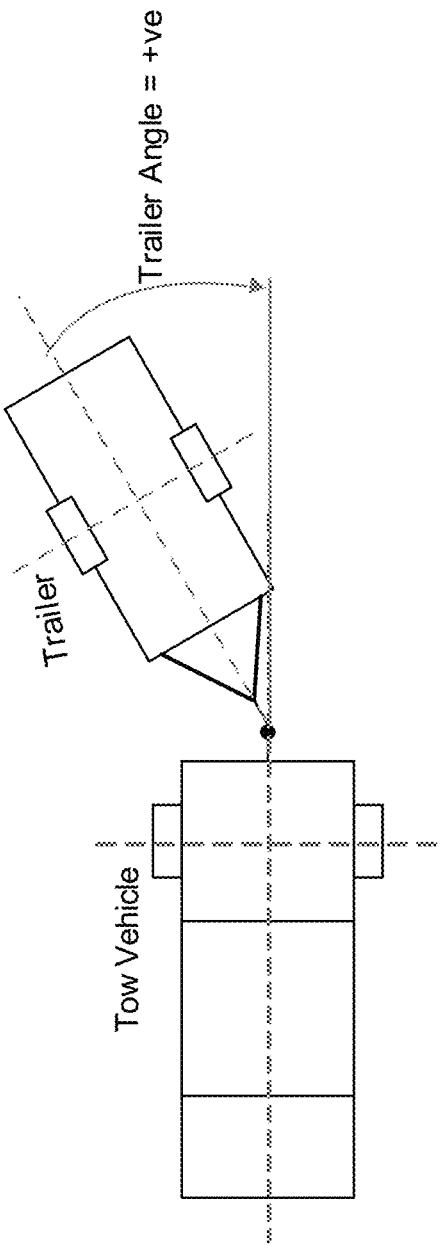
FIG. 6 is a schematic view of the vehicle and the trailer with a positive trailer angle relative to the vehicle.
Figure 7:
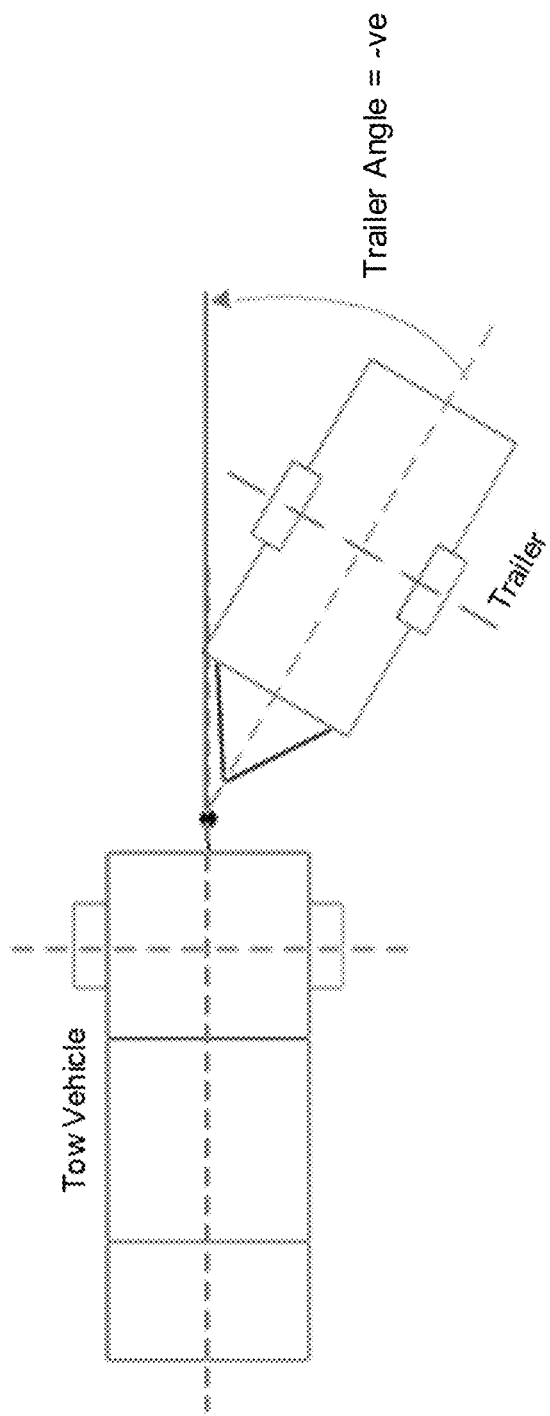
FIG. 7 is a schematic view of the vehicle and the trailer with a negative trailer angle relative to the vehicle.

Referring now to FIGS. 5-7, the trailer angle detection module 220 measures or determines (e.g., using the rearward viewing camera(s) 18) the current trailer angle 222 of the trailer (i.e., the angle of the trailer's centerline axis 22 relative the vehicle's centerline axis 20). The trailer angle detection module 220 may determine the trailer angle is zero degrees when the centerline axis of the trailer 22 is aligned with the centerline axis of the vehicle 20 (FIG. 5). The trailer angle detection module 220 may determine that the current trailer angle 222 is positive when the trailer is at the passenger side or the right side of the vehicle (respective to the centerline axis 20 of the vehicle) (FIG. 6) and the trailer angle detection module 220 may determine that the current trailer angle 222 is negative when the trailer is at the driver side or the left side of the vehicle (respective to the centerline axis 20 of the vehicle) (FIG. 7).

Figure 8:
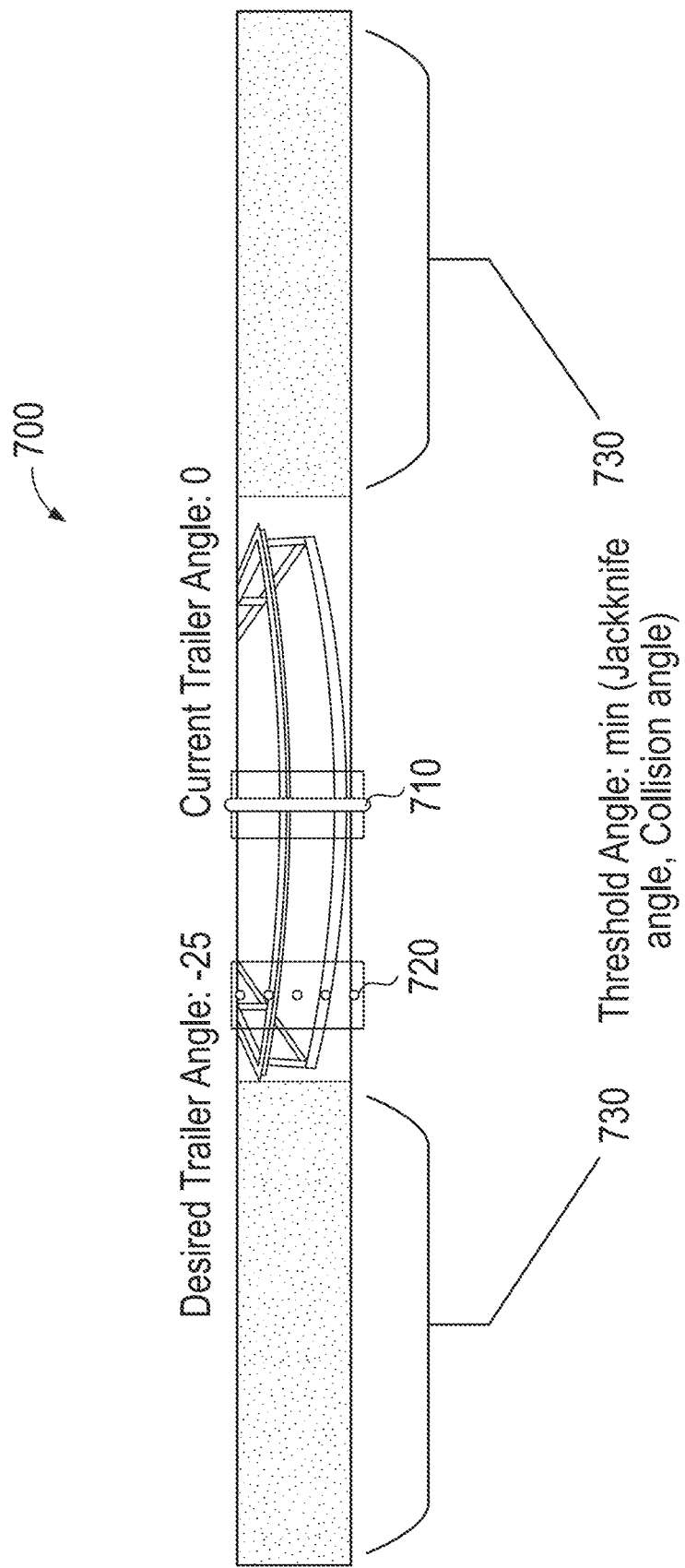
FIG. 8 is a partial view of a trailer captured by a rear facing camera with a trailer angle of zero degrees relative to the vehicle.

Optionally, and such as shown in FIG. 8, the system provides visual feedback of the current trailer angle 222, the desired trailer angle 212 (determined from the user input 200) and other threshold angles, such as jackknife angles and collision angles. For example, a display 24 (FIG. 1) disposed within the vehicle may display images to the driver of the vehicle. In some examples, images captured by one or more cameras 18 (e.g., a fisheye camera) that include at least a portion of the trailer are transformed into a cylinder or cylindrical view 700. A cylindrical view represents images that have been projected onto a surface of a cylinder and then the cylinder has been unrolled to form a flat plane. In this example, rotation of the trailer around the hitch (e.g., increasing and decreasing the current trailer angle 222) results in a lateral movement of the trailer in the cylindrical view. For example, as the current trailer angle 222 increases, the trailer may appear to move laterally to the right in the displayed images, while conversely when the current trailer angle 222 decreases, the trailer may appear to move laterally to the left in the displayed images. In some examples, the cylindrical view corresponds to 180 degree field of view behind the vehicle which corresponds to a maximum trailer angle of 90 degrees and a minimum trailer angle of −90 degrees.

In the cylindrical view 700 (and such as can be seen with reference to FIGS. 9A and 9B), each column of pixels in the display may correspond to a vertical plan representative of a selected trailer angle. For example, when the display has a resolution of 1280×800 pixels, the display has 1280 columns of pixels. In this example, column 0 (i.e., the left-most column of pixels in the display) may correspond to a trailer angle of −90 degrees. That is, when the center of the trailer displayed in the cylindrical view is aligned with column 0, the current trailer angle is −90 degrees. Furthering this example, a vertical line at column 319 (i.e., the 320th column from the left) of pixels (FIG. 9B) may correspond to a trailer angle of −45 degrees (FIG. 9A), column 639 may correspond to a trailer angle of 0 degrees, column 959 may correspond to a trailer angle 45 degrees, and column 1279 (i.e., the right-most column) may correspond to a trailer angle of 90 degrees. Thus, each column of pixels in the displayed cylindrical view 700 may be directly converted to a trailer angle.

Referring back to FIG. 8, the cylindrical view 700 may include a current trailer angle indicator 710. The current trailer angle indicator 710 may be a vertical bar that aligns with the centerline axis 22 of the trailer. The current trailer angle indicator 710 visually indicates to the driver the current trailer angle 222 relative to the vehicle. The cylindrical view may also include the selected or desired trailer angle indicator 720 that updates to reflect the current desired trailer angle 212 derived from the user input 200. For example, when the user slides the indicator 302 of the slider 200*a* to the left, the desired trailer angle indicator 720 may correspondingly move to the left on the displayed cylindrical view 700. In some examples, the display may provide numerical indicators of the current trailer angle and the desired trailer angle. For example, as illustrated in FIG. 8, the display may indicate that the current trailer angle is 0 degrees and the desired trailer angle is −25 degrees (but such angle values may not be displayed as they would not be readily understood by the driver and would not help the driver is selecting the desired angle for the particular reversing maneuver).

Figure 12:
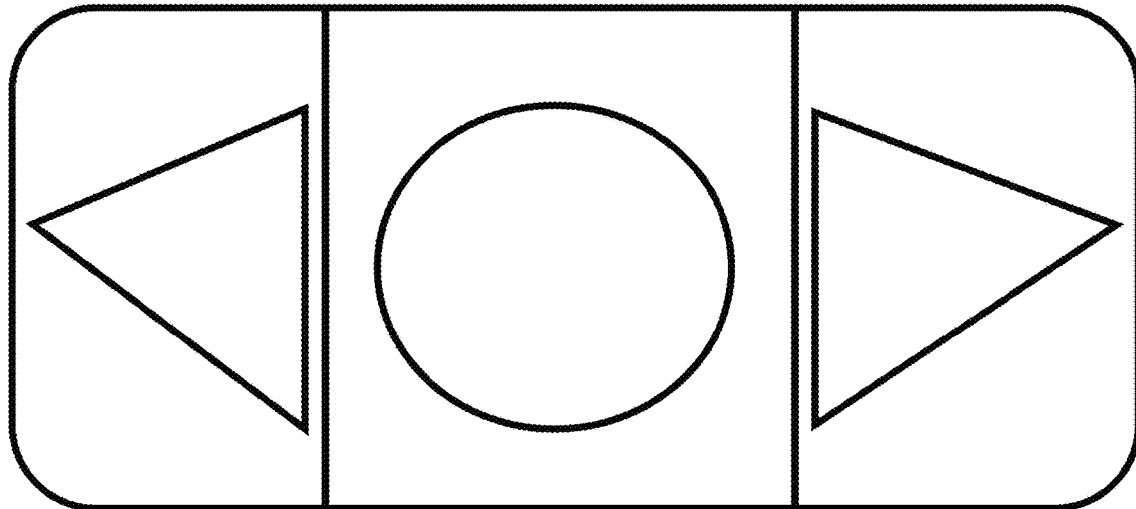
FIG. 12 is a view of a button user input of a human machine interface for use with the trailer guidance system.

Preferably, the human machine interface (HMI) that enables the driver to laterally adjust the indicator 720 has a form and function economical for the automaker to install and provide in the vehicle and convenient and easy to be used by the driver of the vehicle when trailering. The HMI may comprise a slider or laterally slidable element (where the driver laterally slides a sliding element or slides or moves his or her finger across a touch screen), or may comprise buttons or inputs (see FIG. 12), where the user may press a right-hand button to increase the desired trailer angle to the right or may press a left-had button to increase the desired trailer angle to the left (e.g., to set the desired trailer angle to a larger negative value). Such a button (or touch input) HMI may include three buttons, with a middle button provided to allow the driver to reset the desired trailer angle to zero degrees at any time. The driver thus presses or touches the desired input (left, middle, right) to cause the displayed indicator 720 to move at the display screen. Optionally, the rate of speed at which indicator moves (responsive to pressing or touching the left button or input or the right button or input) is pressure dependent (i.e., the harder the button/input is pressed, the faster the displayed indicator moves in that direction). Optionally, such a three-button HMI, for use during trailering, can be used when not trailering to control the exterior mirror element respectively present in a driver-side/left-side exterior mirror assembly and a passenger-side/right-side exterior mirror assembly present on the equipped vehicle.

Figure 13:
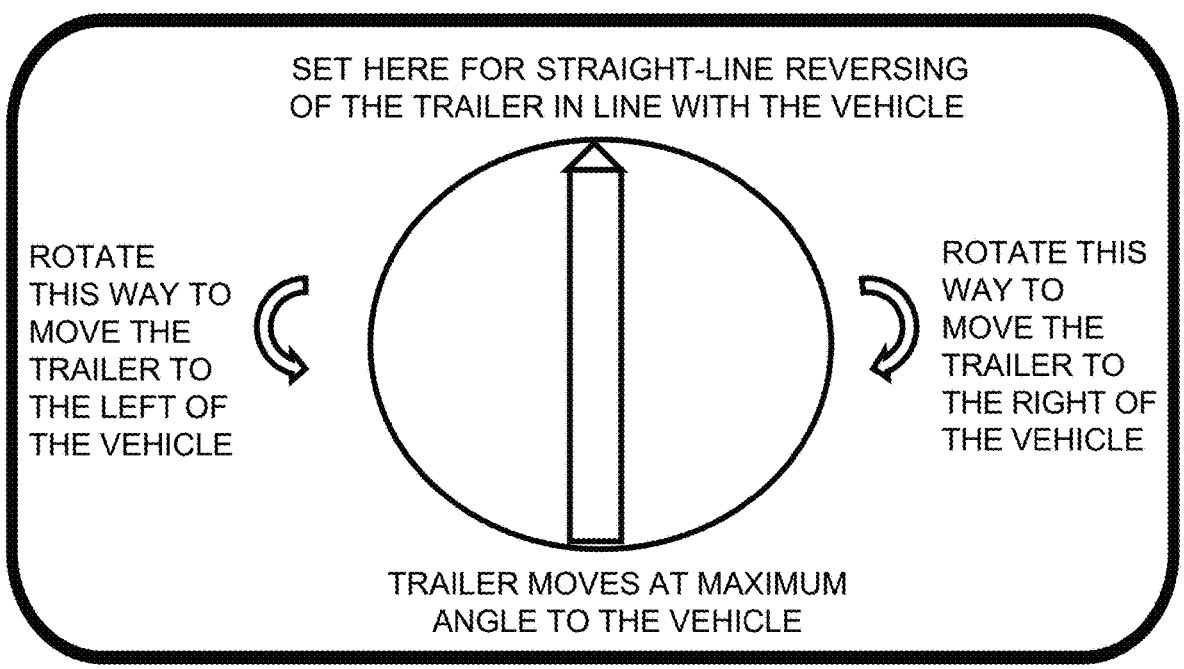
FIG. 13 is a view of a rotatable user input of a human machine interface for use with the trailer guidance system.

Optionally, although discussed above in terms of a laterally movable (left to right or right to left) slider being provided as the HMI, other HMIs may be used, including rotary HMIs. Such a rotary HMI (see FIG. 13) provides a rotatable user input that the driver rotates clockwise or counter-clockwise to adjust the desired trailer angle, with the degree of rotation corresponding to the gradations on the dial or the like. With such a rotary HMI, the input may have a desired trailer angle of zero degrees when the rotatable input points upward, and may have a desired trailer angle of +90 degrees when the rotatable input is rotated 90 degrees clockwise (or 180 degrees clockwise as shown in FIG. 13) and a desired trailer angle of −90 degrees when the rotatable input is rotated 90 degrees counter-clockwise (or 180 degrees counter-clockwise).

Figure 14:
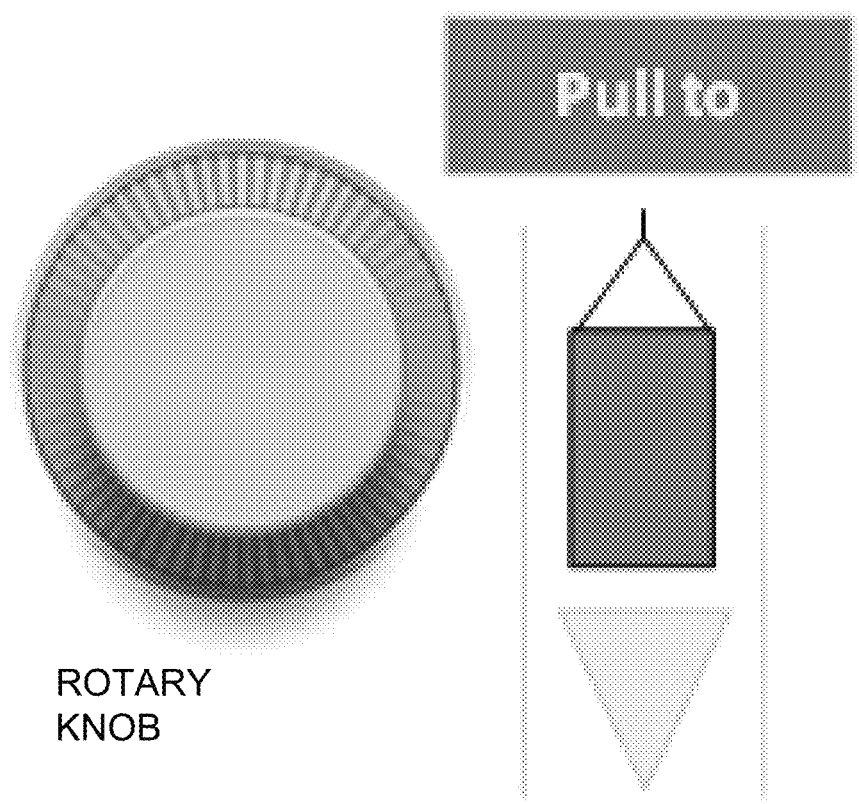
FIG. 14 is a view of another rotatable user input or rotary knob of a human machine interface for use with the trailer guidance system.

As shown in FIG. 14, the user input may comprise a rotary knob or dial. The knob is rotatable by the driver in either direction (i.e., clockwise or counter-clockwise). In a left hand drive vehicle, such as used in the United States, clockwise rotation by the driver indicates to the system of the invention the driver's desire that the trailer back up in a direction to the passenger side or right hand side of the vehicle. Likewise, a counter-clockwise rotation by the driver indicates to the system of the invention the driver's desire that the trailer back up in a direction to the driver side or left hand side of the vehicle. Optionally, a display screen viewable by the driver (or other visual indicating means) may indicate to the driver the direction and/or the trailer angle that coincides with the current selected rotation position of the knob. The knob may be freely rotated (i.e., may be rotated at least 360 degrees and optionally multiples of 360 degrees) and, when released, rests at and remains at the rotational position the driver rotated it to. The knob does not spring back to a zero position or any equivalent.

When it is desired to set the trailer angle to a zero angle or straight line trailer backing up setting, the driver can push the knob (or pull the knob) in a direction along (i.e., parallel to) the axis of rotation of the rotary knob (or optionally can move or translate the knob in a direction generally perpendicular to the axis of rotation of the rotary knob). The knob preferably does not have a center or zero position, since regardless of how far it is rotated in either direction (i.e., the current position of the knob), the system is set to the zero trailer angle only and solely via a further affirmative action by the driver (e.g., by pressing the knob or actuating a zero angle setting button or the like) irrespective of the location, setting or position of the knob. That is, the user may "reset" the knob to a zero degree angle selection without the need to rotate the knob. After the knob is pressed (or pulled) to command the system to set the trailer backing up angle to the zero angle setting, and after the knob is then released, the knob may pop back up or down (under a spring-like or equivalent function), whereby the system remains at the zero angle setting and the trailer backs up in a straight line. Alternatively, after the knob is pressed to set the system to the zero angle setting, and then released, the knob may pop back up, and the system reverts to the trailer angle that coincides with the position that the knob was rotated to be at before the knob was pressed to select the zero angle setting. Optionally, the user may be required to press or pull the knob for at least a threshold period of time (e.g., two seconds) before the trailer angle selection is set to zero.

The HMI thus comprises a controller in the form of a knob that does not automatically "spring back" to and is not biased toward a zero position that makes or causes the trailer angle to be at zero degrees when the driver releases or removes his or her hand from the knob. The knob comprises a free flow or free spinning 360 degree turn or multi-turn knob (such as like a conventional radio volume knob) that does not spring back (or is not biased) to a zero position setting. The knob sets the trailer backing up system to a zero-degree trailer angle when the knob is pushed or pulled in a further affirmative action by the driver of the vehicle. The system may provide an audio/visual indication/haptic warning to the driver when the trailering system determines that the maximum allowed trailer angle limit is reached. Optionally, the trailering system may provide visual and/or haptic and/or audible indication to the driver when the system has been set to a zero trailer angle setting so that the trailer backs up in a straight line. The trailering system software does not set to a larger angle then allowed even if the driver rotates the knob further in that direction. That is, adjusting the trailer angle may be capped by a maximum and a minimum trailer angle and continued rotations past the maximum/minimum do not affect the selected trailer angle.

When pulled/pushed, the knob position in software may be set to zero but the knob does not physically or mechanically move to a zero position. For example, when the driver rotates the knob to the right (i.e., rotates the knob clockwise) that sets a 25 degree trailer angle and with the knob remaining/staying at the same rotational setting/position when the driver releases his or her hand from the rotary knob, the trailering system automatically controls the vehicle steering (while the driver may control the backing up speed via the driver controlling reversing throttle and braking) to bring the current trailer angle to 25 degrees relative to the vehicle centerline during the backing up of the vehicle and trailer, and the system will maintain the trailer angle at 25 degrees (i.e., the vehicle will continue to maintain the trailer angle and, if not changed, will back up the vehicle and trailer in a circle that corresponds to the 25 degree trailer angle) until the driver provides further input. When and only when, and at any time that, the driver pulls/pushes the knob, the trailering system controls the vehicle steering to back up the trailer straight (i.e., in the direction of the central axis or longitudinal axis of the trailer when the knob is pulled/pushed).

The trailering system software may be set to a zero angle setting (trailer backing up straight) upon activation of the trailering system (such as when the driver presses a button to activate the system to commence the backing up maneuver). The trailering system software may also be set to a zero angle setting (backing up straight) upon deactivation of the trailering system (such as via the driver pressing or actuating an "off" button or other HMI, or responsive to a failure or interrupt of the system). The trailering system software may also be set to a zero angle setting (backing up straight) when the knob is pulled or pushed.

Thus, when the driver desires a trailer angle of zero (i.e., the vehicle's centerline axis 20 is aligned with the trailer's centerline axis 22), the driver may press or push or pull the knob, which electronically sets the system to the zero angle, without rotating the knob back to an initial or zero angle position. The knob does not have an indicator on it, so it can be rotated to any position, with the zeroing or resetting of the system being achieved electronically without mechanically rotating the knob back to an initial position. When the user desires a maximum trailer angle, which corresponds with the trailer positioned towards the passenger side of the vehicle (which in a left-hand drive vehicle, such as used in the United States, is at the right-hand side of the vehicle), the user may rotate the knob clockwise an amount that results in the maximum trailer angle (which may be indicated on a display screen or indicator), whereby further clockwise rotation of the knob may occur, but will not change the trailer angle further. Similarly, when the user desires a minimum trailer angle, which corresponds with the trailer positioned towards the driver side of the vehicle, the user may rotate the knob counter-clockwise an amount that results in the maximum trailer angle (which may be indicated on a display screen or indicator), whereby further counter-clockwise rotation of the knob may occur, but will not change the trailer angle further.

Figure 15:
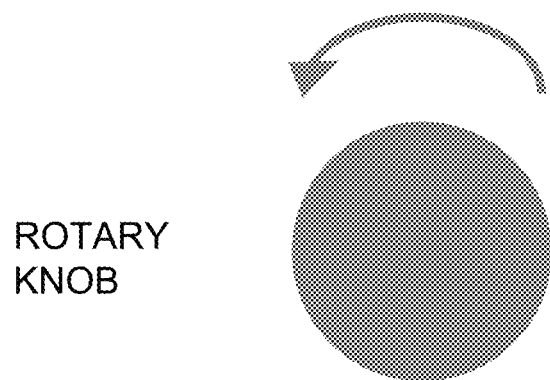
FIG. 15 is a plan view of the rotary knob of FIG. 14, shown being rotated counter-clockwise.
Figure 16A:
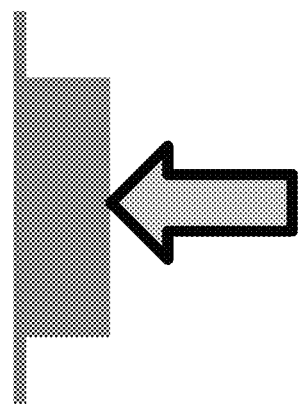
FIG. 16A is a side elevation of the rotary knob of FIG. 15, shown being pressed or pushed inward.
Figure 16B:
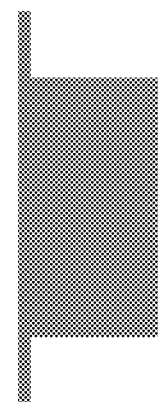
FIG. 16B is another side elevation of the rotary knob of FIG. 15, shown with the knob released or not pushed inward.

Thus, for example, and with reference to FIGS. 15, 16A and 16B, if a driver desires to reverse a trailer to a position at the left side of the vehicle (and rearward of the vehicle), the driver turns the knob to the left (counter-clockwise) at an angle or continuously adjusts knob angles while watching the trailer moving at the side mirrors or at a head unit video display screen that shows the rear view images from the rearward viewing camera or cameras (see FIG. 15). Once the trailer reaches a direction that the driver judges as the desired direction that the trailer should move along straight, the driver pushes (or pulls) the knob (FIG. 16A) once and releases the knob, whereby the knob will return to its original vertical position (FIG. 16B) before the push (or pull) of the knob by the driver. After the knob is pushed to set the trailer angle to the zero trailer angle or straight backing up setting, the trailer guidance controller will automatically control the steering system of the vehicle to maintain the trailer in a straight line with the vehicle (i.e., a zero degree trailer angle relative to the towing vehicle) while backing up. During the trailer straight line backing up maneuver, if the driver sees the needs to further adjust the trailer direction of motion, the driver can turn the knob to a desired angle. Once the driver sees the trailer reach the new desired direction, the driver may push (or pull) the knob again, whereby the system will control the steering system of the vehicle to again move the trailer in the straight line in the new direction.

As a further example, and with reference to FIGS. 17-20, the driver may rotate or turn the knob counter-clockwise to a desired rotational position, such that the trailer backs-up to the left at (for example) a trailer angle of 15 degrees (FIG. 17). When the trailer is heading in a desired direction during the backing up maneuver, the driver may momentarily push/press the center of the knob, such that the trailer now backs up straight at a trailer angle of zero degrees relative to the centerline of the vehicle (FIG. 18). If the driver wishes to adjust the direction of backing up of the trailer, the driver may (without rotating the knob) momentarily push/press the center of the knob again (FIG. 19), whereby the system reverts to backing up the trailer at the trailer angle of 15 degrees (the angle that the knob was set to before the first pressing of the knob). Alternatively, or in addition to the above, if the driver wishes to adjust the direction of backing up of the trailer during straight backing up, the driver may turn the knob to another desired rotational position (FIG. 20), such as, for example, to the left to coincide with a trailer angle of 38 degrees, whereby the system now controls steering of the vehicle to change from the zero-degree trailer angle straight-line trailer backing up to the trailer backing up to the left at a trailer angle of 38 degrees relative to the longitudinal centerline of the vehicle. A further push of the knob again changes to the system backing up the trailer straight at the zero angle setting.

During operation of the trailer guidance system, the logic in the controller receives the zero angle setting command and sets the desired trailer angle to zero degrees when the knob is momentarily pressed (e.g., for a threshold period of time). When the knob is released, the controller operates in the zero angle setting mode and waits for further input from the knob, such as via rotation of the knob or a further pressing of the knob to change the trailer angle from straight backing up. At any moment in time during a backing up maneuver at a non-zero trailer angle, when the knob is pressed, the system changes to back up the trailer straight, and may continue to back up the trailer straight until the knob is again rotated or optionally until the knob is again pressed. Thus, if the knob is pressed when the system is operating to steer the vehicle and trailer at a desired angle (i.e., the knob has been rotated to select a desired trailer angle), the pressing of the knob sets the system to the zero trailer angle setting, and if the knob is pressed when the system is already operating in the zero trailer angle setting, the pressing of the knob reverts the system to operating in accordance with the previous rotational setting of the knob.

In accordance with the present invention, there is no need of or use of a rotational control input device biased at a zero curvature commanding position and moveable to positions within opposing rotational ranges of motion relative to a zero curvature commanding position; nor is there need of or use of trailer steering information derived from an amount of rotation of a rotational control input device with respect to a zero curvature commanding position; nor is there need of or use of a rate movement of a rotational control input device; nor is there need of or use of a direction of movement of a rotational control input device with respect to a zero curvature commanding position. In accordance with the present invention, there is no need of or use of a rotatable control element positionable at a zero curvature commanding position and at positions within opposing rotational ranges of motion relative to a zero curvature commanding position; nor is there need of or use of a rotatable control element movement sensing device coupled to a rotatable control element for sensing movement of the rotatable control element, wherein the rotatable control element movement sensing device outputs a signal generated as a function of at least one of an amount of rotation of the rotatable control element with respect to the zero curvature commanding position, a rate movement of the rotatable control element, and a direction of movement of the rotatable control element with respect to the zero curvature commanding position. In accordance with the present invention, there is no need of or use of a control element manually operable while a trailer reverses to a select position of a plurality of commanding positions, including a zero curvature position and two positions in two opposing ranges of motion that directionally oppose the zero curvature position; nor is there need of or use a control module generating a vehicle steering command based on a commanded trailer path corresponding to the select position of the control element, wherein the steering command is a curvature command that controls a path of the trailer to follow a predetermined curvature based on the select position of the control element while reversing the trailer. In contrast to the above, the present invention provides an improved trailer guidance system that includes a human machine interface (HMI) that does not require the driver to hold a knob or the like while the trailer backing-up maneuver is being conducted, and without a need for (and cost and complexity of) computation of trailer backing-up curvatures or trajectories or the like.

Note that actuation of the user input (such as lateral movement of the slider or pressing at a touch input or button or rotating a rotatable user input) towards the right or towards the left can continuously adjust the desired trailer angle. Alternatively, the user input, when actuated, can adjust the indicator (and selected or desired trailer angle) in predefined or preselected steps, with such steps corresponding to the demarcation indicators. The HMI may be executed or operated as a physical thing separate from the display screen or touch screen (such as a separate electro-mechanical slider or buttons or rotatable input), or may be incorporated as part of the display screen/touch screen (such as a slider or buttons that are actuated via touching at appropriate areas of the touch screen, with the slider or buttons displayed at the touch screen at those areas). For example, the HMI may be located at the instrument panel of the vehicle, at a center console of the vehicle, at the steering wheel of the vehicle or the like. Optionally, the button or toggle user input may be combined with an exterior mirror control. Optionally, a voice activated HMI may be provided (whereby the system may set the desired trailer angle responsive to detection and recognition of a voice input received at one or more microphones in the vehicle), or a gesture detection system may be provided to provide gesture control (whereby the system may set the desired trailer angle responsive to detection and recognition of a gesture responsive to processing of image data captured by one or more cameras in the vehicle).

Use of a lateral user input element that is laterally movable left and right is advantageous in that, for example, lateral movement by the driver of the user input towards the right side of the vehicle will cause the trailer to turn towards that side. In a conventional vehicle, a driver must turn his or her steering wheel in a direction opposite to the direction or location toward which the trailer is to be maneuvered. Thus, the laterally adjustable user input element provides a more readily understood means for steering the vehicle and trailer so that the current trailer angle approaches the desired or selected or set trailer angle.

When the driver actuates a button or other user actuatable device to indicate to the system that the driver is entering a trailering mode to initiate a trailering maneuver, the power steering system of the vehicle then controls steering of the vehicle. Optionally, when the trailering maneuver is initiated, the steering wheel (that the driver can turn clockwise or counter-clockwise) can then function as the user input or HMI for setting the desired trailer angle. For example, when the trailering maneuver is initiated, the steering wheel functions in a steering wheel-trailering mode, whereby the driver turning the steering wheel clockwise selects or sets a desired trailer angle to the right and causes the power steering system of the vehicle to turn the vehicle (by turning the front wheels to the left) such that the trailer hitched to the vehicle is guided to the right as the vehicle and trailer move rearward. Similarly, when the driver turns the steering wheel counter-clockwise, the trailer is caused to travel to the left of the vehicle.

When the driver of the vehicle initiates a trailering maneuver (such as by pressing a button or actuating a trailering initiation input), and when reverse gear is first engaged by the driver putting the transmission of the equipped vehicle into reverse, the rear backup camera captures image data and the video display screen displays real-time video images for the driver to view during the reversing maneuver (such as utilizing aspects of rear backup cameras and displays described in U.S. Pat. No. 10,336,255, which is hereby incorporated herein by reference in its entirety). Display of the trailer guidance indicators superimposed over the displayed real-time video images occurs only after a delay period has elapsed following shifting into reverse gear. During the delay period (commencing when the vehicle transmission is shifted into reverse gear), only video images captured by the rear back up camera are displayed by the video display screen, and the displayed video images are not obscured by any additional trailering indicating overlays.

The displayed images may include an indication of a jackknife zone or collision zone 730 (see FIGS. 8, 11A and 11B). The jackknife zone and collision zones are trailer angles where the trailer is in danger of jackknifing or colliding with the towing vehicle respectively. As illustrated in FIG. 8, these zones 730 may be highlighted (e.g., overlain with semi-transparent color layer) to indicate whether a current trailer angle 222 or a desired trailer angle 720 may cause a jackknife or a collision between the vehicle and the trailer.

In some examples, other views may be displayed by the display 24 to provide visual feedback of the current trailer angle 222, the desired trailer angle 212, and the jackknife/collision threshold angles. For example, a virtual elevated view (e.g., a bird's-eye view) may instead be displayed on the display 24. The virtual elevated view may display the vehicle 10, the trailer 16 at the current trailer angle 222, and the immediate surroundings of the vehicle. The display 24, in some examples, may display a model of the trailer 16 based on the current desired trailer angle 212. That is, the display may display an avatar or representation of the trailer at desired trailer angle to provide visual feedback of the desired trailer angle 212. As the user adjusts the user input 200 (e.g., moves the indicator 302 of the slider 200a or rotates the knob), the avatar may similarly adjust positions around the vehicle 10 to represent the adjusted desired trailer angle 212.

Referring now to FIGS. 10A and 10B, a working example of the system 12 is illustrated. In this example, the current trailer angle 222 is indicated to be 0 degrees by the current trailer angle indicator 710 and the user desires to turn the trailer to the left of the vehicle (e.g., into a driveway at the left side of the road at which the vehicle and trailer are located). The user, using the user input 200 (e.g., the slider 200a or the knob), indicates a desired trailer angle by sliding the indicator 302 to the left of the center point of the slider 200a or rotating the knob so that the indicator 720 moves to a desired location. In this example, the selected desired trailer angle 212 corresponds to negative 25 degrees, which may be indicated by the desired trailer angle indicator 720 (FIG. 10A). That is, as the user actuates or adjusts the user input 200 or rotates the knob, the display displays the current trailer angle indicator 710 reflective of the current trailer angle 222 and the desired trailer angle indicator 720 reflective of the desired trailer angle 212. Based on the target steering angle 232 determined from the CTA 222, the DTA 212, and the current steering angle 242 (e.g., by the gap finder 230), the EPS 240 may turn the steering wheel to the determined steering wheel angle 232.

At this point, the driver may manually control the velocity of the vehicle (e.g., by controlling the accelerator pedal and the brake pedal) to begin moving the vehicle. As the vehicle moves, the current trailer angle 222 will change based on the current steering wheel angle (i.e., the target steering angle 232). As the current trailer angle 222 changes, the current trailer angle indicator 710 displayed on the display will correspondingly change. As the vehicle continues to move, the current trailer angle 222 will approach the desired trailer angle until the current trailer angle 222 is equivalent to or aligned with the desired trailer angle 212 (FIG. 10B). Once the current trailer angle is equal to the desired trailer angle 212 (FIG. 10B), the system 12 may continually update the target steering angle 232 to the EPS 240 as the vehicle moves to maintain the CTA 222 at or near the DTA 212. The system 12 may maintain the CTA 222 at or near the DTA 212 until the DTA 212 is changed via the user input 200 (e.g., moves the indicator 302 or rotates the knob or pushes or pulls the knob to reset the system to zero) or when the system is disabled or deactivated (e.g., via another user input, turning off the vehicle, etc.).

To continue the example, once the desired trailer angle 121 is equal to the current trailer angle 222, the driver may continue to move the vehicle and the system will control the steering of the vehicle to maintain the current trailer angle. Once the turn of the trailer is almost complete (i.e., the trailer has turned into the driveway, but the vehicle is not yet aligned with the trailer), the driver may adjust the desired trailer angle to 0 degrees (such as by pushing or pulling the knob) and continue to move the vehicle until the trailer straightens out behind the vehicle. Thus, the system 12 allows the driver to continuously update the desired trailer angle 212 via the user input 200 and the system will, in response, continuously update the target steering angle 232 to move the current trailer angle 222 toward the desired trailer angle 212. The driver may update the desired trailer angle 212 at any point during the reversing maneuver while stopped or moving. For example, the driver may initially select a relatively sharp trailer angle and then, as the vehicle and trailer are moved rearward toward the sharper trailer angle, the driver may slide the input or rotate the knob in the opposite direction and toward a less sharp trailer angle and eventually toward a zero degree trailer angle to back up the trailer to the targeted or selected destination. The driver may control how sharp the trailer turns by adjusting the desired trailer angle (e.g., a value near zero will result in a gentle turn while a value near −90 or +90 will result in a sharp turn). Throughout the backing up of the vehicle and trailer, the driver maintains control of the speed of the vehicle (i.e., the driver controls the acceleration and braking of the vehicle).

Referring now to FIGS. 11A and 11B, the system 12 does not restrict the user from setting the DTA 212 (e.g., via the user input 200) to an angle within the jackknife and/or collision zones 730. The system may instead alert the user when the desired trailer angle or DTA 212 is selected to be within a jackknife and/or collision zone 730. For example, the system 12 may provide an intermittent audio tone (e.g., a beeping) and/or provide a warning on the display 24. Alternatively, or additionally, the driver can be visually alerted when the desired trailer angle or DTA 212 is selected to be within a jackknife and/or collision zone 730. For example, an electronically generated graphic overlay can be displayed superimposed over the real-time video images of the rearward scene being displayed on the screen of the video monitor that is viewable by the driver of the vehicle when trailering. As a further alternative and/or addition, a tactile or haptic alert (such as a vibrating seat element or the like) may be provided when the DTA 212 is selected to be within a jackknife and/or collision zone 730. The system 12 may, during the reversing maneuver and as the current trailer angle is indicative of the trailer moving toward and/or into a jackknife zone, alert the user when the current trailer angle 222 has entered the jackknife and/or collision zones 730. For example, the system 12 may generate a continuous audio tone and/or display a warning message to the user via the display 24. A frequency of the continuous audio tone may be different than a frequency of the intermittent beeping when the desired trailer angle 212 is within the jackknife zone 730. The system 12 may include a message to the driver that, in order to re-enable the system 12 (e.g., to begin controlling steering), the driver must manually drive forward to bring the current trailer angle 222 out of the jackknife zone 730.

The advantages of the trailer guidance system include that there is no requirement or need for the system to calculate or determine a trajectory of the trailer along which the trailer will move to arrive at the target destination. Thus, the system avoids the costs and complexities associated with computing such trajectories or target paths along which the trailer is to be moved or associated with the ECU measuring any deviation of the measure of orientation of the trailer relative to the vehicle from an intended direction of travel of the trailer relative to the vehicle and without the need for consequential implementation of path correcting measures.

Figure 21:
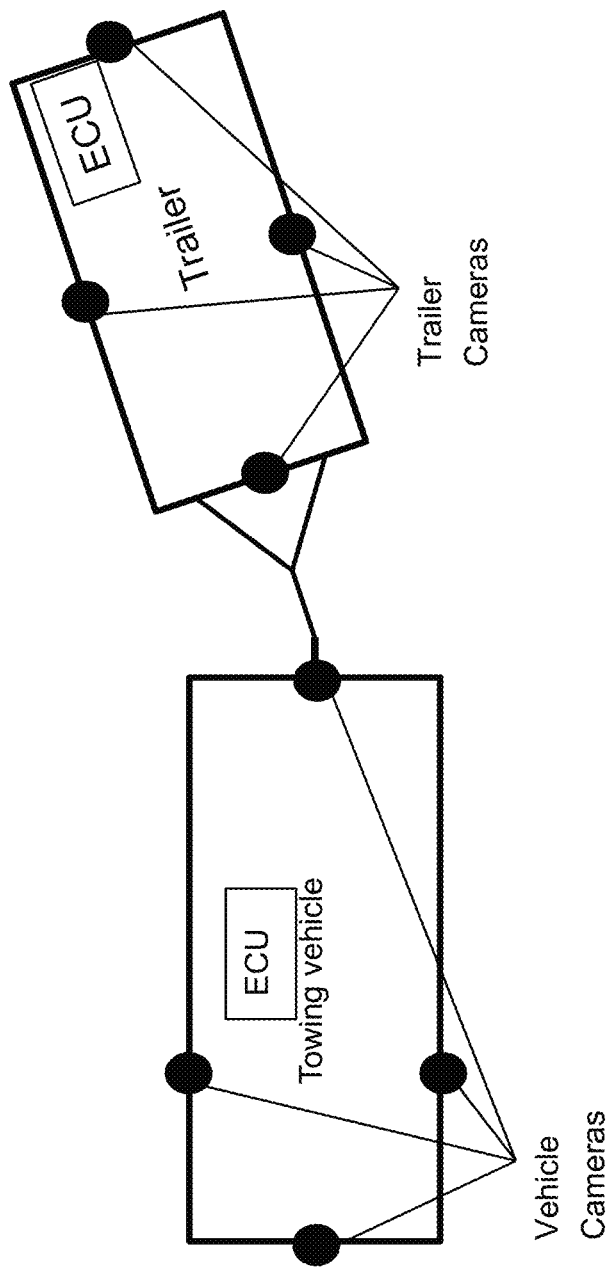
FIG. 21 is a plan view diagram of the towing vehicle and the trailer hitched to the towing vehicle, showing the vehicle having four surround view vehicle cameras and the trailer having four surround view trailer cameras.
Figure 23:
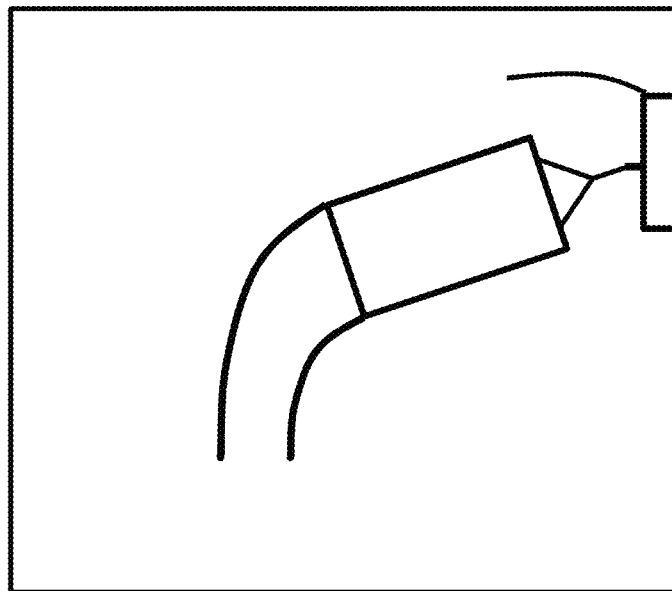
FIG. 23 is a surround view image displayed by the system when the driver selects a 360 degree bird's-eye/top down view of the trailer.
Figure 22:
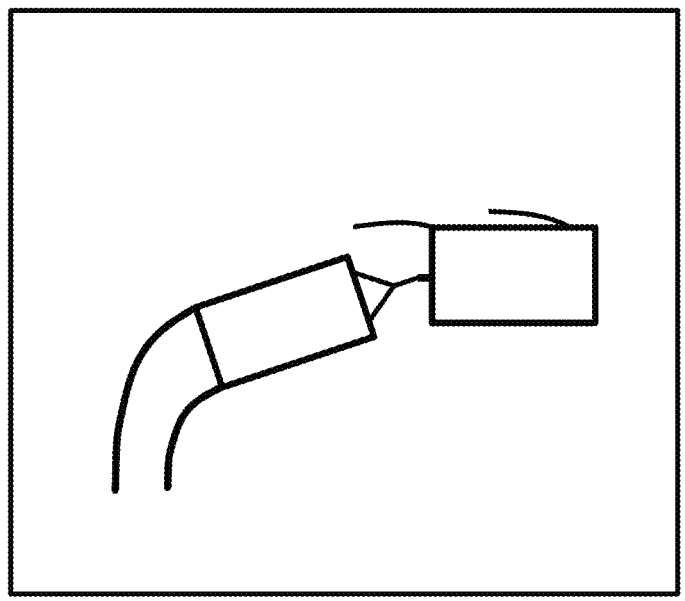
FIG. 22 is a surround view image displayed by the system when the driver selects a 360 degree bird's-eye/top down view of the vehicle and the trailer.
Figure 27:
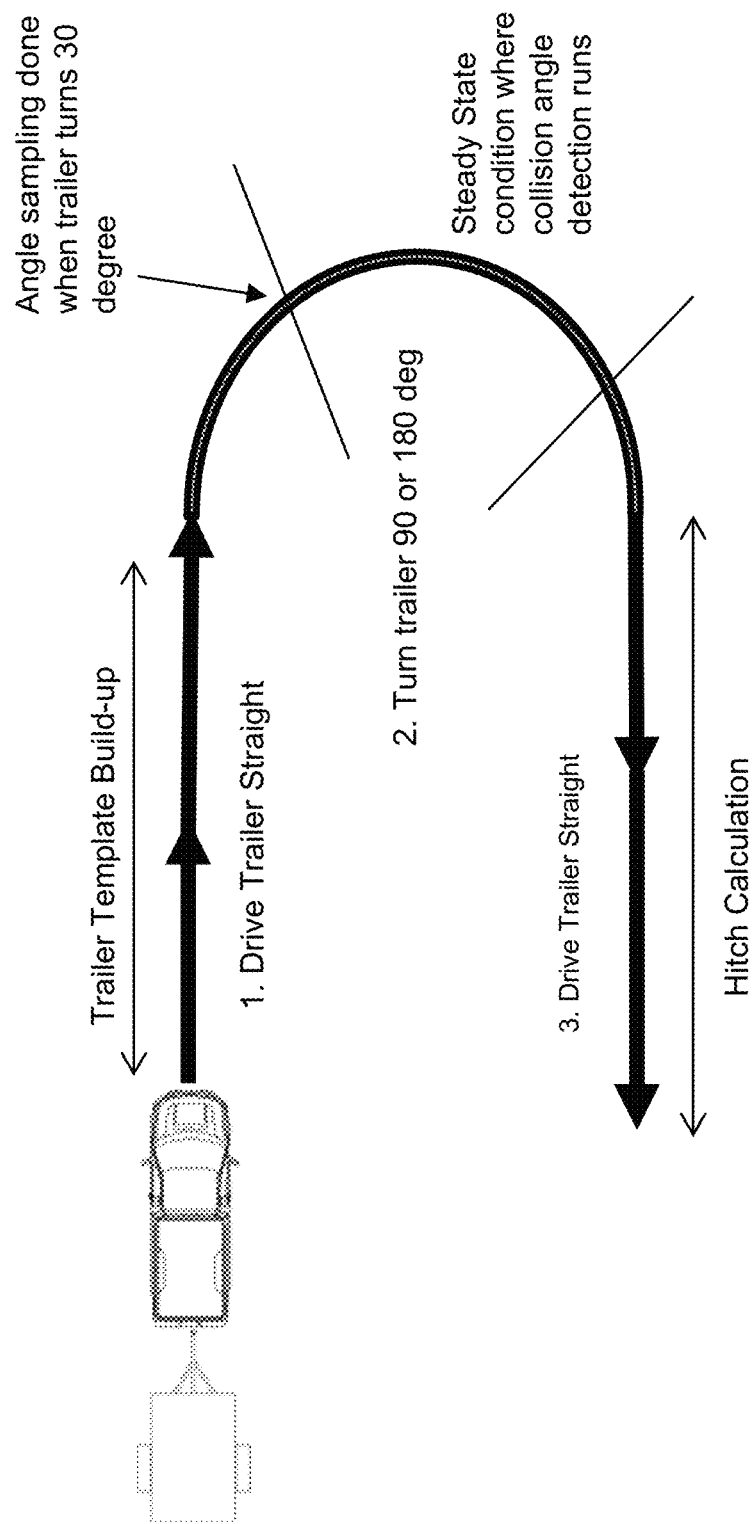
FIG. 27 is a plan view showing an exemplary calibration drive of the vehicle and trailer in accordance with the calibration maneuver steps of FIGS. 24-26.
Figure 28:
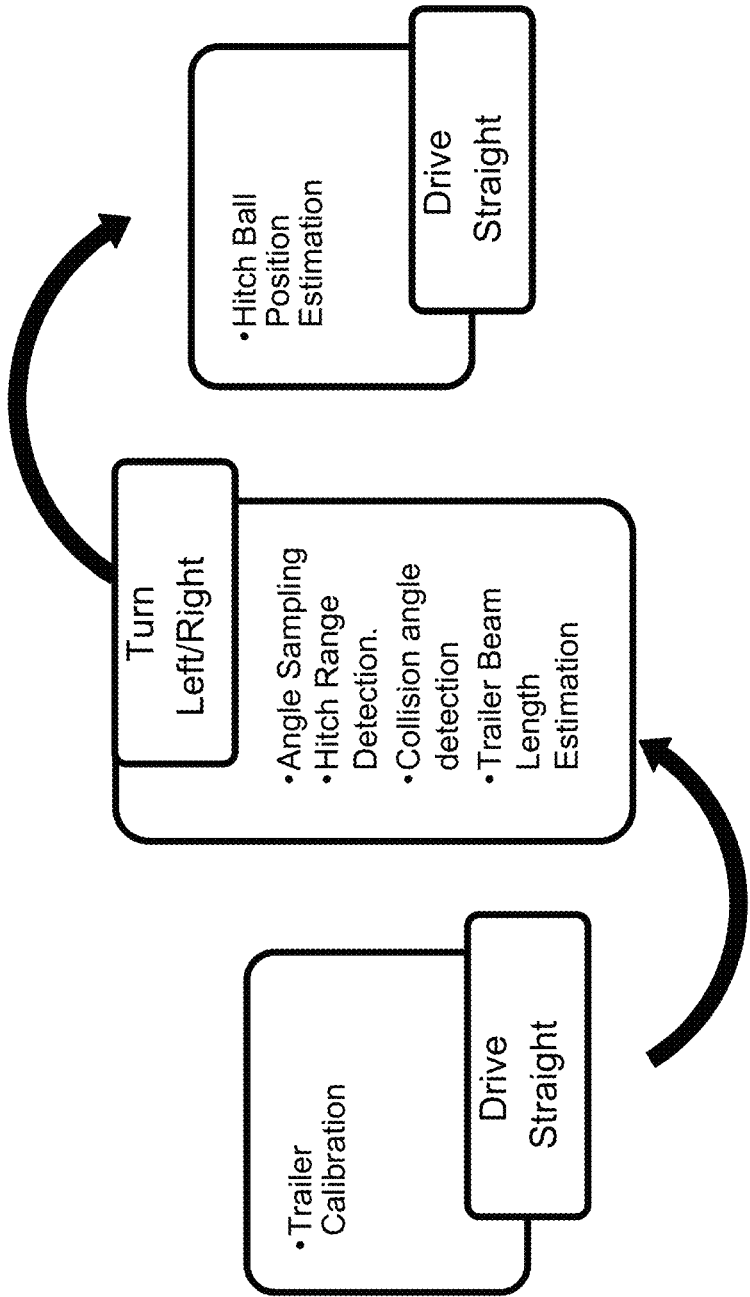
FIG. 28 is a block diagram of feature detection of trailer features/characteristics during the calibration drive.

Optionally, and such as shown in FIGS. 21-23, the vehicle and the trailer may both be equipped with multi-camera systems having multiple cameras to provide various bird's-eye/top down views of the areas surrounding the vehicle and/or trailer (including avatars representing the vehicle and trailer or portions thereof). As shown in FIG. 21, the vehicle may include a front forward viewing vehicle camera, a left-side vehicle camera, a right-side vehicle camera and the rear backup camera, while the trailer may include a front forward viewing trailer camera, a left-side trailer camera, a right-side trailer camera and a rear trailer camera. The vehicle and the trailer may each be equipped with a surround view system ECU or a common ECU may be disposed at the vehicle (with the image data captured by the trailer cameras being provided to the common vehicle-based ECU). The system provides a complete 360 degree view around the vehicle and trailer. Dynamic guideline overlays may provide real-time feedback to the driver of the future positions of trailer and towing vehicle while the vehicle is backing up the trailer, such as via the trailer guidance system and responsive to the driver selection of an input device (knob or slider) that the driver uses to select the trailer backing up direction. The trailer 360 view provides better coverage around the trailer and provides enhanced reverse guidance and real time feedback to the driver when the driver uses the knob or slider input device to select the direction of trailer movement.

The system allows the driver to select various bird's eye/top down views, such as, for example, a bird's-eye/top down view of vehicle and trailer (FIG. 22), or a zoomed in 360 degree surround view of the trailer (FIG. 23), or a three-dimensional view of the vehicle and trailer and the surroundings. The system of the present invention includes providing ability of the driver sitting in the driver seat of the vehicle to, for example, select for display on the in-cabin video screen that is viewable by the driver, (i) a bird's-eye/top down view derived solely from image data captured by the multi-camera system of the vehicle, or (ii) a bird's-eye/top down view derived solely from image data captured by the multi-camera system of the trailer, or (iii) a bird's-eye/top down view derived solely from image data captured by the multi-camera system of the vehicle laterally tiled with a bird's-eye/top down view derived solely from image data captured by the multi-camera system of the trailer, such as in a side-by-side arrangement. The system may not need to duplicate the view captured by the front camera of the trailer and the view captured by the rear backup camera of the vehicle. The surround views and three dimensional views may be generated utilizing aspects of the systems described in U.S. Pat. Nos. 10,071,687; 9,900,522; 9,834,153; 9,762,880; 9,558,409; 9,446,713; 9,264,672 and/or 9,126,525, and/or U.S. Publication No. US-2015-0022664, which are hereby incorporated herein by reference in their entireties.

As shown in FIG. 22, the system may provide a surround view display of images for viewing by the driver of the vehicle during the backing up maneuver of the vehicle and trailer. Video image data captured by some or all of at least eight cameras, with four vehicle cameras (front/left-side/right-side/rear) and up to four trailer cameras (front/left-side/right-side/rear) or more, may be image processed to generate a variety of bird's-eye/top down views that when displayed on the video screen in the interior cabin of the vehicle allow the driver when backing up the trailer to have a bird's-eye/top down view of areas surrounding the vehicle and trailer, including to the front of, to the sides of and rearward of the vehicle and to the front of, to the sides of and rearward of the trailer hitched to the vehicle.

For example, one vehicle/trailer bird's-eye/top down view may comprise a bird's-eye/top down view that shows areas adjacent to/surrounding the left side of the vehicle, the left side of the trailer, the right side of the vehicle, the right side of the trailer, the front of the vehicle, the front of the trailer, the rear of the vehicle and the rear of the trailer. Since the rear backup camera of the vehicle and the front camera of the trailer commonly view the trailer tongue region between the back of the towing vehicle and the front of the trailer body, any duplication in image data displayed and viewable by the driver in the vehicle viewing the video display is avoided so that the driver sees in bird's-eye/top down form what is between the vehicle and trailer and laterally thereof. Such bird's-eye/top down views allow the driver to better gauge the areas adjacent to/surrounding the vehicle/trailer combination, and thereby be able to appropriately intervene to avoid colliding with objects while driving over desirable areas via the trailer guidance system of the present invention. Thus, if the driver so observes such objects, the driver can take corrective action, such as easing or releasing the accelerator pedal of the vehicle to slow down or cease reversing and/or brake the vehicle and/or by exiting the trailer guidance system of the vehicle and assume manual steering control or by changing the selected input position or setting to cause the ECU of the trailer guidance system to control the electronic power steering system of the vehicle to change direction of backing up of the trailer to avoid obstacles, etc.

Optionally, image data captured by the towing vehicle cameras and the trailer cameras can be provided to a central ECU, that preferably is disposed at the towing vehicle, and the bird's-eye/top down views can be synthesized/generated in the central or common ECU using image processing techniques such as described in U.S. Pat. Nos. 10,071,687; 9,900,522; 9,834,153; 9,762,880; 9,558,409; 9,446,713; 9,264,672 and/or 9,126,525, and/or U.S. Publication No. US-2015-0022664, which are hereby incorporated herein by reference in their entireties. Image data captured by the trailer cameras optionally may be wirelessly communicated to be received at the towing vehicle and provided to the common ECU disposed in the towing vehicle. Alternatively, image data captured by the trailer cameras may be provided to the towing vehicle via a wired linkage from the trailer to the towing vehicle. Preferably, the common ECU also operates to provide the trailer guidance of the present invention. As an alternative to a common ECU, distributed ECUs may be used. For example, an ECU disposed at the towing vehicle can synthesize bird's-eye/top down views derived from image data captured by the four (or more) vehicle cameras, with this vehicle-based ECU preferably also running the trailer guidance of the present invention. A second ECU can be disposed at the trailer, and that trailer-based ECU is operable to generate bird's-eye/top down views derived from image data captured by the four (or more) trailer cameras.

Preferably, an HMI (such as a selector switch or touch control or the like) is provided in the towing vehicle and is selectable by the driver of the vehicle for display on the in-vehicle cabin video display screen of selected views selected from a menu of selectable bird's eye/top down views. For example, the driver can select for display a 360 degree bird's eye/top down view surrounding the towing vehicle and the trailer. Another selection can be a bird's eye/top down view derived at least from image data captured by the left side vehicle camera, the front vehicle camera and the right side vehicle camera (alternatively including the rear backup camera of the vehicle), and/or the driver may select a bird's eye/top down view derived at least from image data captured by the left side trailer camera, the rear trailer camera and the right side trailer camera (or alternatively including the front trailer camera). If both the vehicle surround view and the trailer surround view are selected, the video display may display the views laterally tiled in a side-by-side arrangement. Another menu selection can be a bird's eye/top down view derived from image data captured by the front vehicle camera, the left side vehicle camera, the left side trailer camera and the rear trailer camera. Another menu selection can be a bird's eye/top down view derived from image data captured by the front vehicle camera, the right side vehicle camera, the right side trailer camera and the rear trailer camera. Another menu selection can be a bird's eye/top down view derived from image data captured by the left side vehicle camera, the rear backup camera of the vehicle, the front camera of the trailer and the left side trailer camera, such bird's eye/top down view allowing the driver to see at least part of the region separating the towing vehicle from the trailer, and also see whether there is hazard of collision between the left-most rear corner of the towing vehicle and the front-most left corner of the trailer body. Another menu selection can be a bird's eye/top down view derived from image data captured by the right side vehicle camera, the rear backup camera of the vehicle, the front camera of the trailer and the right side trailer camera, such bird's eye/top down view allowing the driver to see at least part of the region separating the towing vehicle from the trailer, and also see whether there is hazard of collision between the right-most rear corner of the towing vehicle and the front-most right corner of the trailer body. Optionally, and less desirably, only the towing vehicle may be multi-camera equipped so that during a backing up event, various bird's-eye/top down views can be displayed for viewing by the driver that allows the driver to view areas surrounding the towing vehicle as well as at least partially seeing areas adjacent to the lateral sides of the trailer.

Note that optionally and preferably, image data captured by some (or all) of the vehicle cameras and/or by some or all of the trailer cameras can be image processed at an image processor(s) disposed at either (or both) of the vehicle and the trailer. Responsive to such image processing, objects or obstacles exterior either (or both) of the vehicle and the trailer can be detected, and the driver of the vehicle can be alerted to their presence (such by an audible alert or by a tactile/haptic/rumble alert or by a visual indicator or by a graphic overlay overlaying video images captured by some (or all) of the vehicle cameras and/or by some (or all) of the trailer cameras being displayed at an in-cabin video display screen viewable by the driver operating the vehicle to back up the trailer). The image processor preferably may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties) that detect objects utilizing edge detection. The image processing chip preferably is part of the ECU used for trailer guidance.

Thus, the trailer guidance system may utilize a driver input that comprises a slider or rotary element that is laterally adjustable to position the slider element at a position along a slider range or that is rotatable through a rotation range that correlates to a range of desired trailer angles (e.g., 0 to 60 degrees to the right and to the left of center and relative to a longitudinal axis of the vehicle), with the center position of the slider element (or with a push of the rotary input or knob and without rotating the knob back to an initial position) correlating to a zero degree trailer angle (where a longitudinal axis of the trailer or trailer tongue is in line with the longitudinal axis of the vehicle). The driver thus can move the slider or rotate the knob to the right or to the left to a particular position along its range that correlates to a desired or selected trailer angle to be achieved when backing up the vehicle and trailer. Responsive to the set or selected trailer angle, the ECU commands and controls the electronically controlled power steering of the vehicle to, as the vehicle and trailer are backed up, bring the current determined trailer angle to be the same as the desired or set trailer angle. When the determined trailer angle matches the desired trailer angle, the vehicle continues to back up and the ECU maintains the desired trailer angle for the backing up maneuver (absent further input to the driver input or HMI from the driver). For example, a driver could move the slider half-way to the left to select a 20 degree angle. While the driver backs up the vehicle and trailer, the driver can turn off the trailer guidance assist system. For example, the driver may position the slider at the center position or push the knob or hit a "back up straight" button or input, whereby the ECU controls the power steering to bring the determined trailer angle to zero and then the vehicle and trailer can back up in a straight line. If the driver moves the slider or rotates the knob during the backup maneuver, the ECU controls the power steering to bring the determined trailer angle to the new trailer angle setting.

Thus, in accordance with embodiments of the present invention, a driver of a vehicle desiring to use a vehicle equipped with a trailer towing hitch first connects a trailer tongue of a trailer to the trailer towing hitch of the vehicle to establish a pivoting joint or pivoting connection of the trailer tongue of the trailer to the trailer hitch of the vehicle that will allow operation and steering of the vehicle to tow the trailer when driving forward and to back up the trailer during a backing up maneuver. When connecting the trailer to the vehicle, the vehicular trailer guidance system asks and requires that the particular trailer now hitched to the vehicle be identified to the vehicular trailer guidance system, which the driver does by inputting an identification or name of the trailer to the vehicular trailer guidance system (such as via voice command or keypad entry or data touch input or alphanumeric individual selection of alphanumeric characters via the likes of a joystick/rotary knob or the like). With the particular trailer now identified to the system, the system determines whether the trailer is a previously identified trailer.

If the hitched trailer is not a previously identified/known trailer, the system initiates a trailer calibration procedure for that particular identified trailer. A preferred calibration procedure is disclosed in U.S. patent application Ser. No. 17/443,258, filed Jul. 23, 2021, Ser. No. 17/443,257, filed Jul. 23, 2021, and/or Ser. No. 17/443,256, filed Jul. 23, 2021, which are hereby incorporated herein by reference in their entireties. Calibration under the preferred procedure includes the steps set forth in FIGS. 24-28. Such a calibration process may be desired or required when, for example, a new trailer (if not previously calibrated) is hitched to the trailer, or for a previously calibrated trailer, when there is a change in shape of the trailer (installing after-market items on the trailer tongue or drawbar), when the hitch length gets changed (e.g., by 2 inches), or when there is an unsuccessful previous calibration(s).

The calibration procedure requires the driver, with the trailer hitched to the vehicle, to drive the vehicle straight forward for a desired minimum straight line driving distance, and then manually steer the vehicle to make a right hand (or left hand) turn. The system determines desired characteristics of the trailer during the calibration procedure (such characteristics including the trailer beam length [the distance between the trailer coupler (that attaches to the trailer hitch ball of the vehicle) at the end of the trailer tongue and the center of the trailer axle] and the collision angle [the trailer angle at which the truck and trailer would collide]). By following the preferred calibration procedure, physical measurement by the driver of physical characteristics of the particular trailer hitched to the vehicle (such as distance of the trailer tongue to the camera, location of the camera relative to the vehicle ball hitch, trailer beam length, etc.) is obviated.

Upon the system determining the desired characteristics, during calibration driving by the driver of the vehicle towing the trailer, the system stores such trailer characteristics/ trailer data in a memory of the system (typically a memory chip on the ECU), under the identifier or name for the particular trailer input by the driver, and the system alerts/ informs the driver that trailer calibration has been successfully completed. When that same trailer is next hitched to the vehicle, and upon the driver identifying that particular trailer when requested to by the control/ECU of the system of the present invention, the system searches the memory of the control/ECU for previously stored and calibrated identified trailers and recognizes that this particular identified trailer has already been calibrated to the vehicle, and so no further calibration for that particular trailer is need, and the backing-up trailer guidance by the system can commence.

With a recognized and identified particular trailer now being hitched to the vehicle, the vehicular trailer guidance system is operable to back up the trailer during a backing up maneuver of the vehicle with the trailer hitched thereto via the driver operating a three mode human machine interface (HMI) accessible by the driver while sitting in the driver's seat of the vehicle. The system is operable to steer the vehicle to properly back up the trailer via controlling the electronic power steering system of the vehicle, and not by the driver turning the steering wheel to steer the vehicle during the backing up maneuver of the trailer. Taking as an example, a vehicle used in the United States and other right hand drive countries (that drive on the right side of a two-way road), and bearing in mind that with the trailer tongue hitched to the trailer hitch of the vehicle, the vehicle's rear backup camera, while continuing to view at least a portion of the trailer tongue, is otherwise generally or partially or wholly obstructed in its rearward view by the body of the trailer itself, the driver of the vehicle (either looking at or using a left/driver side exterior mirror of the vehicle or looking out a left side/driver side window of the vehicle) determines a location/destination/area behind and to the left of the vehicle and trailer that the driver desires to back up the trailer towards/to. The driver, having first activated the vehicular trailer guidance system of the present invention via an appropriate input (if not already activated due to the required calibration for the hitched trailer), operates the three mode HMI to cause the electronic power steering system of the vehicle to back up the trailer toward the target/selected location/destination/area. The three mode HMI comprises a first or left mode HMI, a second or center or straight mode HMI and a third or right mode HMI.

For example, when desiring to back up the trailer towards/ to a location rearward and to the left of the rear of the trailer, the driver slides a slider or rotates the knob of a slider first mode HMI to the left or in a counter-clockwise direction, and with the degree of movement of the slider to the left (along a maximum range of left slider movement allowed) or rotation of the knob being commensurate with how far leftward/laterally sideward the driver desires to back up the trailer towards/to. Wherever along such a slider scale of the first mode HMI the driver slides the slider knob to (with the slider knob remaining at the selected location upon release of the slider knob by the driver), the system of the invention correlates that to a desired trailer angle to be achieved for backing up the trailer towards the target/selected location/ destination/area that is left-sideward and rearward of the back of the trailer. The system operates/controls the electronic power steering system of the vehicle to bring the steering angle of the vehicle (as known and determined by the electronic power steering system of the vehicle) to come in line with and match the desired trailer angle commensurate with where the driver has leftward-moved the slider or rotated the knob of the first mode left-backup HMI. The furthest leftward that the driver can move/slide the left slider corresponds with a maximum trailer angle that the system permits for a leftward trailer backing up event. Wherever the driver slides the slider input knob to along its permitted range/track of travel and rests there, the system of the invention maintains the trailer angle of the trailer relative to the longitudinal axis of the vehicle at the desired trailer angle.

Backing up of the vehicle and trailer to the right, using the third or right back up mode is similar to the left backing up maneuver, but of course with the driver using a right-side (in the USA, passenger side) exterior rearview mirror or by looking out a right-side side window of the vehicle to decide the target/selected location/destination/area where the driver desires to right-side backup the trailer towards/to.

At any time that the driver selects the second or straight back up mode HMI, the system of the invention determines that the driver wishes to back the trailer straight up (i.e., in a straight line rearward that is in line with or parallel to the longitudinal axis of the trailer at the time that the second mode HMI is selected or actuated). Thus, upon selection of the straight back up mode, the system of the invention controls the electronic power steering system of the vehicle to move the trailer angle to zero degrees and maintain it at zero degrees backing straight up.

The three mode HMI of the system of the invention can have several forms. Preferably, three separate user inputs are provided, each corresponding to (i) a left-side/left orientated input corresponding to the first or left back up mode, (ii) a separate center/straight input corresponding to the second or straight back up mode, or (iii) a right-side/right orientated input corresponding to the third or right back up mode, with all three inputs arranged generally horizontally at, for example, an instrument panel of the interior cabin of the vehicle, where they are generally and readily accessible by the driver's hand. By so orientating and arranging the three user inputs in parallel, the driver can cognitively and readily associate the left input with the left back up maneuver, the center input with the straight back up maneuver and the right input with the right back up maneuver. Since the three inputs are separate, the driver can readily select any one of them. Thus, for example, the left or first mode input can be a slider with a degree of leftward slide being commensurate with the degree of leftward backing up desired, the center input can be a button that, when pressed, causes straight line backing up, and when pressed again exits straight line backing up, and the right or third mode input can be a slider with a degree of rightward slide being commensurate with the degree of rightward backing up desired.

Of course other HMI configurations can be used. For example, a rotary knob can be used that, when rotated to the left, corresponds with the leftward or first mode, when rotated to the right, corresponds with the rightward or third mode, and with a separate central push button (or optionally a switch actuated by pushing the rotary knob itself) that, when the driver separately presses the central push button, causes the system to enter or exit the straight backup mode.

A rotatable driver interface, such as is described in U.S. Pat. No. 8,972,109, which is hereby incorporated herein by reference in its entirety, that includes a rotational control input device at a zero position and movable to opposing left backing up and right backing up positions relative to the zero position can be used with the system of the present invention, but is less desirable to be used than using the preferred separately driver accessible second mode of the three mode HMI of the system of the present invention. This is at least because having the likes of a rotary knob controlling a trailer backing up event that automatically swings back to/is biased back to the zero or straight line backing up position means that, once the driver releases the counterclockwise knob rotation or releases the clockwise knob rotation, the rotary knob returns to the center position and backing up of the trailer changes to straight line backing up, whether the driver so wants or not. By having the preferred three independent mode HMI of the present invention, the driver (for example) can move a slider switch to halfway to the left-permitted span of travel and then release the slider switch, whereupon the system of the invention will continue to back up the trailer at the trailer angle corresponding to where the first mode HMI slider is positioned and released by the driver. Then, in accordance with the present invention, when the driver wishes to change to straight line trailer backing up, the driver is free to operate/engage the separate second mode.

Thus, when the driver of the vehicle decides to back up the trailer to a target/selected location/destination/area located rearward and laterally sideward/leftward of the back of the vehicle, the driver moves the first mode/input to a position along its range of travel that the driver can associate with backing up towards such a desired target/selected location/destination/area. For example, a graphic overlay may be shown on the video screen overlaying video images captured by the rear backup camera, and this overlay enables or allows the driver to gauge where/how far laterally sideward to the left of the back of the trailer the driver wishes to back up the trailer towards and to.

Once the driver moves the HMI knob or slider on the slider scale to correspond to where he or she wishes to back up, the control/ECU receives an output from the first mode HMI (preferably provided via a vehicle communication bus or CAN bus of the vehicle) indicating to the ECU the selected slider position/trailer angle that the driver has selected to back up the trailer to where the driver-desired target/selected location/destination/area. Upon receiving that input from the HMI, the ECU, responsive at least in part to processing image data captured by the rear backup camera, determines the then current trailer angle, and the ECU receives from the electronic power steering system of the vehicle and/or from a steering wheel/steering position sensor of the vehicle the then current steering angle of the vehicle (that is typically determined by the angle the two front wheels of the vehicle are making relative to the longitudinal axis of the vehicle).

The ECU then controls the electronic power steering system of the vehicle, with the driver operating the accelerator pedal and/or brake pedal of the vehicle to propel the vehicle rearward and control the rearward speed of the vehicle, to bring the angle made by the tongue of the trailer to coincide with an angle commensurate with the position of the HMI slider along the range of travel of the slider selected by the driver. Upon the electronic power steering system of the vehicle having reversed the vehicle so that the then current trailer angle of the tongue of the trailer relative to the longitudinal axis of the vehicle coincides with the trailer angle desired for the trailer to back up towards the driver desired/selected/target destination/location/area, the ECU controls the electronic power steering system of the vehicle to steer/maintain that desired trailer angle, while the driver continues to back up the trailer using the accelerator pedal of the vehicle to propel the vehicle rearward (desirably at a low rearward travel velocity, such as below five mph) until the driver either disables the trailer guidance system of the vehicle or selects a different mode (e.g., the backing up straight mode or the backup up right mode) or moves or changes the backing up left mode's slider to a different location.

The system may utilize aspects of the trailering assist systems or trailer angle detection systems or trailer hitch systems described in U.S. Pat. Nos. 10,755,110; 10,733,757; 10,706,291; 10,638,025; 10,586,119; 10,552,976; 10,532,698; 10,160,382; 10,086,870; 9,558,409; 9,446,713; 9,085,261 and/or 6,690,268, and/or U.S. Publication Nos. US-2021-0170947; US-2021-0170820; US-2021-0078634; US-2020-0406967; US-2020-0361397; US-2020-0356788; US-2020-0334475; US-2020-0017143; US-2019-0118860; US-2019-0064831; US-2019-0143895; US-2018-0276838; US-2018-0215382; US-2017-0254873 and/or US-2017-0217372, and/or U.S. patent application Ser. No. 17/643,596, filed Dec. 10, 2021, Ser. No. 17/443,258, filed Jul. 23, 2021, Ser. No. 17/443,257, filed Jul. 23, 2021, and/or Ser. No. 17/443,256, filed Jul. 23, 2021, and/or International Publication No. WO 2021/127693, which are all hereby incorporated herein by reference in their entireties.

The system includes an image processor operable to process image data captured by the camera or cameras, such as for detecting objects or other vehicles or pedestrians or the like in the field of view of one or more of the cameras. For example, the image processor may comprise an image processing chip selected from the EYEQ family of image processing chips available from Mobileye Vision Technologies Ltd. of Jerusalem, Israel, and may include object detection software (such as the types described in U.S. Pat. Nos. 7,855,755; 7,720,580 and/or 7,038,577, which are hereby incorporated herein by reference in their entireties), and may analyze image data to detect vehicles and/or other objects. Responsive to such image processing, and when an object or other vehicle is detected, the system may generate an alert to the driver of the vehicle and/or may generate an overlay at the displayed image to highlight or enhance display of the detected object or vehicle, in order to enhance the driver's awareness of the detected object or vehicle or hazardous condition during a driving maneuver of the equipped vehicle.

The vehicle may include any type of sensor or sensors, such as imaging sensors or radar sensors or lidar sensors or ultrasonic sensors or the like. The imaging sensor or camera may capture image data for image processing and may comprise any suitable camera or sensing device, such as, for example, a two dimensional array of a plurality of photosensor elements arranged in at least 640 columns and 480 rows (at least a 640×480 imaging array, such as a megapixel imaging array or the like), with a respective lens focusing images onto respective portions of the array. The photosensor array may comprise a plurality of photosensor elements arranged in a photosensor array having rows and columns. Preferably, the imaging array has at least 300,000 photosensor elements or pixels, more preferably at least 500,000 photosensor elements or pixels and more preferably at least 1 million photosensor elements or pixels. The imaging array may capture color image data, such as via spectral filtering at the array, such as via an RGB (red, green and blue) filter or via a red/red complement filter or such as via an RCC (red, clear, clear) filter or the like. The logic and control circuit of the imaging sensor may function in any known manner, and the image processing and algorithmic processing may comprise any suitable means for processing the images and/or image data.

Optionally, the vision system may include a display for displaying images captured by one or more of the imaging sensors for viewing by the driver of the vehicle while the driver is normally operating the vehicle. Optionally, for example, the vision system may include a video display device, such as by utilizing aspects of the video display systems described in U.S. Pat. Nos. 5,530,240; 6,329,925; 7,855,755; 7,626,749; 7,581,859; 7,446,650; 7,338,177; 7,274,501; 7,255,451; 7,195,381; 7,184,190; 5,668,663; 5,724,187; 6,690,268; 7,370,983; 7,329,013; 7,308,341; 7,289,037; 7,249,860; 7,004,593; 4,546,551; 5,699,044; 4,953,305; 5,576,687; 5,632,092; 5,708,410; 5,737,226; 5,802,727; 5,878,370; 6,087,953; 6,173,501; 6,222,460; 6,513,252 and/or 6,642,851, and/or U.S. Publication Nos. US-2014-0022390; US-2012-0162427; US-2006-0050018 and/or US-2006-0061008, which are all hereby incorporated herein by reference in their entireties.

Changes and modifications in the specifically described embodiments can be carried out without departing from the principles of the invention, which is intended to be limited only by the scope of the appended claims, as interpreted according to the principles of patent law including the doctrine of equivalents.

The invention claimed is:

1. A vehicular trailer guidance system, the vehicular trailer guidance system comprising:

a rear backup camera disposed at a rear portion of a vehicle, the vehicle equipped with (i) an electronically controlled power steering system and (ii) a trailer ball hitch configured for connection to a trailer tongue of a trailer;

wherein the rear backup camera comprises a CMOS imaging array having at least one million photosensors arranged in rows and columns;

wherein the rear backup camera views at least rearward of the vehicle;

wherein, with a trailer tongue of a trailer hitched at the trailer ball hitch of the vehicle to form a pivoting joint attaching the trailer to the vehicle, the rear backup camera views at least a portion of the trailer tongue hitched to the vehicle;

wherein the rear backup camera captures image data;

a human machine interface provided in an interior cabin of the vehicle and operable by a driver in a driver seat of the vehicle during a backing up maneuver of the vehicle and trailer, wherein the human machine interface is operable in (i) a backing up trailer left-backup mode, (i) a backing up trailer straight-backup mode and (iii) a backing up trailer right-backup mode;

wherein the human machine interface comprises a rotary knob, and wherein (i) the human machine interface operates in the backing up trailer left-backup mode when rotated counter-clockwise, (ii) the human machine interface operates in the backing up trailer straight-backup mode when one selected from the group consisting of (a) the rotary knob is pushed and (b) the rotary knob is pulled and (iii) the human machine interface operates in the backing up trailer right-backup mode when rotated clockwise;

an electronic control unit (ECU) comprising electronic circuitry and associated software, the electronic circuitry comprising an image processor operable to process image data captured by the rear backup camera;

wherein the vehicular trailer guidance system, responsive at least in part to processing by the image processor of image data captured by the rear backup camera, determines trailer angle of the trailer tongue relative to a longitudinal axis of the vehicle;

wherein, responsive to selection by the driver of the backing up trailer left-backup mode by rotating the rotary knob in the counter-clockwise direction, the vehicular trailer guidance system sets a desired trailer angle of the trailer tongue leftward relative to the longitudinal axis of the vehicle to an angle that is commensurate with a driver-selected setting of the rotary knob;

wherein, responsive to selection by the driver of the backing up trailer right-backup mode by rotating the rotary knob in the clockwise direction, the vehicular trailer guidance system sets the desired trailer angle of the trailer tongue rightward relative to the longitudinal axis of the vehicle to an angle that is commensurate with a driver-selected setting of the rotary knob;

wherein, responsive to selection by the driver of the backing up trailer straight-backup mode by one selected from the group consisting of (a) pushing the rotary knob and (b) pulling the rotary knob, the vehicular trailer guidance system sets the desired trailer angle of the trailer tongue to a zero degree angle relative to the longitudinal axis of the vehicle;

wherein the vehicular trailer guidance system, based at least in part on the determined trailer angle and the set desired trailer angle, and while the vehicle is backing up the trailer, controls the electronically controlled power steering system of the vehicle to steer the vehicle to back up the trailer to have the determined trailer angle coincide with the set desired trailer angle;

a video display disposed in the interior cabin of the vehicle and viewable by the driver of the vehicle, wherein the video display, while the vehicle is backing up the trailer, displays video images derived from image data captured by the rear backup camera;

wherein the video display, responsive to the determined trailer angle and the set desired trailer angle, displays graphic overlays indicative of the determined trailer angle and the set desired trailer angle; and wherein the video images are converted to a cylindrical view for display at the video display.

2. The vehicular trailer guidance system of claim 1, wherein the rotary knob is rotatable 360 degrees.

3. The vehicular trailer guidance system of claim 1, wherein, when the driver pushes or pulls the rotary knob for the vehicular trailer guidance system to set the desired trailer angle of the trailer tongue to the zero degree angle relative to the longitudinal axis of the vehicle, the zero degree angle coincides with the current rotational position of the rotary knob.

4. The vehicular trailer guidance system of claim 1, wherein, after the driver pushes or pulls the rotary knob for the vehicular trailer guidance system to set the desired trailer angle of the trailer tongue to the zero degree angle relative to the longitudinal axis of the vehicle and releases the rotary knob, the vehicular trailer guidance system controls the electronically controlled power steering system of the vehicle to steer the vehicle to back up the trailer to have the determined trailer angle coincide with the zero degree angle.

5. The vehicular trailer guidance system of claim 1, wherein, after the driver pushes or pulls the rotary knob for the vehicular trailer guidance system to set the desired trailer angle of the trailer tongue to the zero degree angle relative to the longitudinal axis of the vehicle and releases the rotary knob, the vehicular trailer guidance system controls the electronically controlled power steering system of the vehicle to steer the vehicle to back up the trailer to have the determined trailer angle coincide with the set desired trailer angle as set by the rotary knob position before the driver pushed or pulled the rotary knob.

6. The vehicular trailer guidance system of claim 1, wherein the rotary knob is freely rotatable in either direction and is not biased toward a zero angle position.

7. The vehicular trailer guidance system of claim 1, wherein the driver selects the backing up trailer straight-backup mode by pushing or pulling the rotary knob in a direction parallel to an axis of rotation of the rotary knob.

8. The vehicular trailer guidance system of claim 1, wherein the driver selects the backing up trailer straight-backup mode by pushing or pulling the rotary knob in a direction normal to an axis of rotation of the rotary knob.

9. The vehicular trailer guidance system of claim 1, wherein the rotary knob is configured to be positionable by the driver at a plurality of positions, and wherein counterclockwise rotation of the rotary knob past a position that coincides with a maximum left trailer angle does not increase the desired trailer angle beyond the maximum left trailer angle, and wherein clockwise rotation of the rotary knob past a position that coincides with a maximum right trailer angle does not increase the desired trailer angle beyond the maximum right trailer angle.

10. The vehicular trailer guidance system of claim 1, wherein the vehicular trailer guidance system, responsive to the determined trailer angle coinciding with the set desired trailer angle, controls the electronically controlled power steering system to maintain the determined trailer angle at the set desired trailer angle.

11. The vehicular trailer guidance system of claim 1, wherein, during backing up of the trailer, the vehicular trailer guidance system controls the electronically controlled power steering system to change steering angle of front wheels of the vehicle relative to the longitudinal axis of the vehicle.

12. The vehicular trailer guidance system of claim 1, wherein, while the vehicle is backing up the trailer with the human machine interface operating in the backing up trailer left-backup mode, and responsive to selection by the driver of the vehicle of the backing up trailer center-backup mode, the vehicular trailer guidance system controls the electronically controlled power steering system to steer the vehicle backing up the trailer to have the trailer tongue align with the longitudinal axis of the vehicle.

13. The vehicular trailer guidance system of claim 1, wherein the video display comprises an array of rows and columns of pixels, and wherein each column of pixels of the array corresponds to a respective trailer angle in the cylindrical view.

14. The vehicular trailer guidance system of claim 1, wherein the graphic overlays of the determined trailer angle and the set desired trailer angle are displayed on the video display using vertical bars.

15. The vehicular trailer guidance system of claim 1, wherein the video display displays graphic overlays indicative of jackknife zones of the trailer.

16. The vehicular trailer guidance system of claim 1, wherein the rear backup camera of the vehicle is part of a multi-camera bird's-eye/top down system of the vehicle, and wherein image data captured by individual cameras of the multi-camera bird's-eye/top down system of the vehicle are image processed to generate composite views viewable at an in-cabin video display of bird's-eye/top down views of areas surrounding or adjacent to the vehicle.

17. The vehicular trailer guidance system of claim 16, wherein the trailer is equipped with a multi-camera bird's-eye/top down system, and wherein image data captured by individual cameras of the multi-camera bird's-eye/top down system of the trailer are image processed to generate composite views viewable at an in-cabin video display of bird's-eye/top down views of areas surrounding or adjacent to the trailer.

18. The vehicular trailer guidance system of claim 17, wherein, when the driver is backing up the trailer, a composite bird's-eye/top down view is displayed solely derived from image data captured by cameras of the multi-camera bird's-eye/top down system of the vehicle.

19. The vehicular trailer guidance system of claim 17, wherein, when the driver is backing up the trailer, a composite bird's-eye/top down view is displayed solely derived from image data captured by cameras of the multi-camera bird's-eye/top down system of the trailer.

20. The vehicular trailer guidance system of claim 19, wherein, when the driver is backing up the trailer, a composite bird's-eye/top down view is also displayed solely derived from image data captured by cameras of the multi-camera bird's-eye/top down system of the vehicle, and wherein the displayed composite bird's-eye/top down view derived from image data captured by cameras of the multi-camera bird's-eye/top down system of the vehicle is laterally tiled from the displayed composite bird's-eye/top down view derived from image data captured by cameras of the multi-camera bird's-eye/top down system of the trailer.

21. A vehicular trailer guidance system, the vehicular trailer guidance system comprising:
a rear backup camera disposed at a rear portion of a vehicle, the vehicle equipped with (i) an electronically controlled power steering system and (ii) a trailer ball hitch configured for connection to a trailer tongue of a trailer;
wherein the rear backup camera comprises a CMOS imaging array having at least one million photosensors arranged in rows and columns;
wherein the rear backup camera views at least rearward of the vehicle;
wherein, with a trailer tongue of a trailer hitched at the trailer ball hitch of the vehicle to form a pivoting joint attaching the trailer to the vehicle, the rear backup camera views at least a portion of the trailer tongue hitched to the vehicle;
wherein the rear backup camera captures image data;
a human machine interface provided in an interior cabin of the vehicle and operable by a driver in a driver seat of the vehicle during a backing up maneuver of the vehicle and trailer, wherein the human machine interface is operable in (i) a backing up trailer left-backup mode, (i) a backing up trailer straight-backup mode and (iii) a backing up trailer right-backup mode;
wherein the human machine interface comprises a rotary knob rotatable 360 degrees and movable along an axis parallel to an axis of rotation of the rotary knob, and wherein (i) the human machine interface operates in the backing up trailer left-backup mode when rotated counter-clockwise, (ii) the human machine interface operates in the backing up trailer straight-backup mode when one selected from the group consisting of (a) the rotary knob is pushed along the axis parallel to the axis of rotation of the rotary knob and (b) the rotary knob is pulled along the axis parallel to the axis of rotation of the rotary knob and (iii) the human machine interface operates in the backing up trailer right-backup mode when rotated clockwise;
an electronic control unit (ECU) comprising electronic circuitry and associated software, the electronic circuitry comprising an image processor operable to process image data captured by the rear backup camera;
wherein the vehicular trailer guidance system, responsive at least in part to processing by the image processor of image data captured by the rear backup camera, determines trailer angle of the trailer tongue relative to a longitudinal axis of the vehicle;
wherein, responsive to selection by the driver of the backing up trailer left-backup mode by rotating the rotary knob in the counter-clockwise direction, the vehicular trailer guidance system sets a desired trailer angle of the trailer tongue leftward relative to the longitudinal axis of the vehicle to an angle that is commensurate with a driver-selected setting of the rotary knob;
wherein, responsive to selection by the driver of the backing up trailer right-backup mode by rotating the rotary knob in the clockwise direction, the vehicular trailer guidance system sets the desired trailer angle of the trailer tongue rightward relative to the longitudinal axis of the vehicle to an angle that is commensurate with a driver-selected setting of the rotary knob;
wherein, responsive to selection by the driver of the backing up trailer straight-backup mode by one selected from the group consisting of (a) pushing the rotary knob along the axis parallel to the axis of rotation of the rotary knob and (b) pulling the rotary knob along the axis parallel to the axis of rotation of the rotary knob, the vehicular trailer guidance system sets the desired trailer angle of the trailer tongue to a zero degree angle relative to the longitudinal axis of the vehicle; and
wherein the vehicular trailer guidance system, based at least in part on the determined trailer angle and the set desired trailer angle, and while the vehicle is backing up the trailer, controls the electronically controlled power steering system of the vehicle to steer the vehicle to back up the trailer to have the determined trailer angle coincide with the set desired trailer angle.

22. The vehicular trailer guidance system of claim 21, wherein, when the driver pushes or pulls the rotary knob for the vehicular trailer guidance system to set the desired trailer angle of the trailer tongue to the zero degree angle relative to the longitudinal axis of the vehicle, the zero degree angle coincides with the current rotational position of the rotary knob.

23. The vehicular trailer guidance system of claim 22, wherein, after the driver pushes or pulls the rotary knob for the vehicular trailer guidance system to set the desired trailer angle of the trailer tongue to the zero degree angle relative to the longitudinal axis of the vehicle and releases the rotary knob, the vehicular trailer guidance system controls the electronically controlled power steering system of the vehicle to steer the vehicle to back up the trailer to have the determined trailer angle coincide with the zero degree angle.

24. The vehicular trailer guidance system of claim 23, wherein, after the driver pushes or pulls the rotary knob for the vehicular trailer guidance system to set the desired trailer angle of the trailer tongue to the zero degree angle relative to the longitudinal axis of the vehicle and releases the rotary knob, the vehicular trailer guidance system controls the electronically controlled power steering system of the vehicle to steer the vehicle to back up the trailer to have the determined trailer angle coincide with the set desired trailer angle as set by the rotary knob position before the driver pushed or pulled the rotary knob.

25. The vehicular trailer guidance system of claim 24, wherein the rotary knob is freely rotatable in either direction and is not biased toward a zero angle position.

26. A vehicular trailer guidance system, the vehicular trailer guidance system comprising:
a rear backup camera disposed at a rear portion of a vehicle, the vehicle equipped with (i) an electronically controlled power steering system and (ii) a trailer ball hitch configured for connection to a trailer tongue of a trailer;
wherein the rear backup camera comprises a CMOS imaging array having at least one million photosensors arranged in rows and columns;
wherein the rear backup camera views at least rearward of the vehicle;
wherein, with a trailer tongue of a trailer hitched at the trailer ball hitch of the vehicle to form a pivoting joint attaching the trailer to the vehicle, the rear backup camera views at least a portion of the trailer tongue hitched to the vehicle;
wherein the rear backup camera captures image data;

a human machine interface provided in an interior cabin of the vehicle and operable by a driver in a driver seat of the vehicle during a backing up maneuver of the vehicle and trailer, wherein the human machine interface is operable in (i) a backing up trailer left-backup mode, (i) a backing up trailer straight-backup mode and (iii) a backing up trailer right-backup mode;

wherein the human machine interface comprises a rotary knob, and wherein (i) the human machine interface operates in the backing up trailer left-backup mode when rotated counter-clockwise, (ii) the human machine interface operates in the backing up trailer straight-backup mode when one selected from the group consisting of (a) the rotary knob is pushed and (b) the rotary knob is pulled and (iii) the human machine interface operates in the backing up trailer right-backup mode when rotated clockwise;

an electronic control unit (ECU) comprising electronic circuitry and associated software, the electronic circuitry comprising an image processor operable to process image data captured by the rear backup camera;

wherein the vehicular trailer guidance system, responsive at least in part to processing by the image processor of image data captured by the rear backup camera, determines trailer angle of the trailer tongue relative to a longitudinal axis of the vehicle;

wherein, responsive to selection by the driver of the backing up trailer left-backup mode by rotating the rotary knob in the counter-clockwise direction, the vehicular trailer guidance system sets a desired trailer angle of the trailer tongue leftward relative to the longitudinal axis of the vehicle to an angle that is commensurate with a driver-selected setting of the rotary knob;

wherein, responsive to selection by the driver of the backing up trailer right-backup mode by rotating the rotary knob in the clockwise direction, the vehicular trailer guidance system sets the desired trailer angle of the trailer tongue rightward relative to the longitudinal axis of the vehicle to an angle that is commensurate with a driver-selected setting of the rotary knob;

wherein, responsive to selection by the driver of the backing up trailer straight-backup mode by one selected from the group consisting of (a) pushing the rotary knob and (b) pulling the rotary knob, the vehicular trailer guidance system sets the desired trailer angle of the trailer tongue to a zero degree angle relative to the longitudinal axis of the vehicle;

wherein the vehicular trailer guidance system, based at least in part on the determined trailer angle and the set desired trailer angle, and while the vehicle is backing up the trailer, controls the electronically controlled power steering system of the vehicle to steer the vehicle to back up the trailer to have the determined trailer angle coincide with the set desired trailer angle;

wherein the vehicular trailer guidance system, responsive to the determined trailer angle coinciding with the set desired trailer angle, controls the electronically controlled power steering system to maintain the determined trailer angle at the set desired trailer angle; and a video display disposed in the interior cabin of the vehicle and viewable by the driver of the vehicle, wherein the video display, while the vehicle is backing up the trailer, displays video images derived from image data captured by the rear backup camera.

27. The vehicular trailer guidance system of claim 26, wherein the video display, responsive to the determined trailer angle and the set desired trailer angle, displays graphic overlays indicative of the determined trailer angle and the set desired trailer angle.

28. The vehicular trailer guidance system of claim 27, wherein the video images are converted to a cylindrical view for display at the video display.

29. The vehicular trailer guidance system of claim 28, wherein the video display comprises an array of rows and columns of pixels, and wherein each column of pixels of the array corresponds to a respective trailer angle in the cylindrical view.

30. The vehicular trailer guidance system of claim 28, wherein the graphic overlays of the determined trailer angle and the set desired trailer angle are displayed on the video display using vertical bars.

* * * * *